(12) United States Patent
Kimura et al.

(10) Patent No.: US 8,690,435 B2
(45) Date of Patent: Apr. 8, 2014

(54) DYNAMIC PRESSURE BEARING AND SPINDLE MOTOR USING THE SAME

(75) Inventors: Akihiro Kimura, Kyoto (JP); Kyoko Horise, Kyoto (JP); Ryota Ogino, Kyoto (JP); Kunio Sakurada, Kyoto (JP); Teiichi Hirono, Kyoto (JP)

(73) Assignee: Nidec Corporation, Kyoto (JP)

(*) Notice: Subject to any disclaimer, the term of this patent is extended or adjusted under 35 U.S.C. 154(b) by 592 days.

(21) Appl. No.: 12/952,223

(22) Filed: Nov. 23, 2010

(65) Prior Publication Data

US 2011/0123139 A1    May 26, 2011

(30) Foreign Application Priority Data

Nov. 25, 2009  (JP) .................................. 2009-268038
Nov. 16, 2010  (JP) .................................. 2010-255728

(51) Int. Cl.
  *F16C 32/06*    (2006.01)
(52) U.S. Cl.
  USPC ........................................ 384/119; 384/100
(58) Field of Classification Search
  USPC ................... 384/100, 114, 119, 120; 310/90;
                         360/99.04, 99.08, 98.07
  See application file for complete search history.

(56) References Cited

U.S. PATENT DOCUMENTS

| | | | |
|---|---|---|---|
| 5,533,811 A | 7/1996 | Polch et al. | |
| 5,558,443 A | 9/1996 | Zang | |
| 6,211,592 B1 | 4/2001 | Ichiyama | |
| 6,246,136 B1 | 6/2001 | Ichiyama | |
| 7,265,467 B2 * | 9/2007 | Sumi | 310/90 |
| 8,277,125 B2 * | 10/2012 | Kimura et al. | 384/100 |
| 2004/0090702 A1 | 5/2004 | Aiello et al. | |
| 2004/0096131 A1 | 5/2004 | Aiello et al. | |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |

(Continued)

FOREIGN PATENT DOCUMENTS

| | | |
|---|---|---|
| CN | 1532430 A | 9/2004 |
| CN | 1906424 A | 1/2007 |

(Continued)

OTHER PUBLICATIONS

Official Communication issued in International Patent Application No. PCT/JP2009/059556, mailed on Jul. 7, 2009.

(Continued)

*Primary Examiner* — Richard W Ridley
*Assistant Examiner* — Adam D Rogers
(74) *Attorney, Agent, or Firm* — Keating & Bennett, LLP

(57) ABSTRACT

A dynamic pressure bearing has a reduced axial dimension and is constructed to ensure smooth feeding of a lubricating oil. The dynamic pressure bearing includes a communicating hole and at least one tapered seal, and is constructed such that an opening angle of one of the at least one tapered seal through which oil feeding is possible is in a range of about 30 degrees inclusive to about 180 degrees exclusive, a tapered seal wall surface depth $W_1$ of the tapered seal is about 0.3 mm or more, and a sum of distances over which the lubricating oil travels from both sides of an end portion of the communicating hole in a cross-section beyond a wall surface of the communicating hole along a wall surface opposite the end portion of the communicating hole exceeds an inside diameter of the communicating hole.

13 Claims, 28 Drawing Sheets

(56) References Cited

U.S. PATENT DOCUMENTS

| | | | |
|---|---|---|---|
| 2005/0111769 | A1 | 5/2005 | Haga |
| 2005/0225187 | A1 | 10/2005 | Hafen et al. |
| 2006/0002638 | A1 | 1/2006 | Ichiyama |
| 2006/0002641 | A1 | 1/2006 | Ichiyama |
| 2006/0039634 | A1 | 2/2006 | Ichiyama |
| 2006/0039636 | A1 | 2/2006 | Ichiyama |
| 2006/0051001 | A1 | 3/2006 | Nishimura et al. |
| 2006/0097592 | A1* | 5/2006 | Sumi ............... 384/107 |
| 2006/0210205 | A1 | 9/2006 | Engesser et al. |
| 2006/0222276 | A1 | 10/2006 | Uenosono |
| 2007/0140605 | A1* | 6/2007 | Asada et al. .......... 384/107 |
| 2007/0140606 | A1 | 6/2007 | Feng et al. |
| 2007/0154123 | A1 | 7/2007 | Gomyo et al. |
| 2007/0177832 | A1 | 8/2007 | Gotoh et al. |
| 2007/0211971 | A1 | 9/2007 | Obara et al. |
| 2008/0006332 | A1 | 1/2008 | Ishizawa et al. |
| 2008/0008408 | A1* | 1/2008 | Asada et al. .......... 384/100 |
| 2008/0056104 | A1 | 3/2008 | Nishimura et al. |
| 2009/0129710 | A1 | 5/2009 | Ito et al. |
| 2009/0140587 | A1 | 6/2009 | Popov et al. |
| 2009/0140588 | A1 | 6/2009 | Drautz et al. |
| 2009/0279818 | A1 | 11/2009 | Le et al. |
| 2010/0124387 | A1 | 5/2010 | Fuss et al. |

FOREIGN PATENT DOCUMENTS

| | | |
|---|---|---|
| JP | 06-028335 U | 4/1994 |
| JP | 06-121484 A | 4/1994 |
| JP | 07-336924 A | 12/1995 |
| JP | 2000-014079 A | 1/2000 |
| JP | 2002-005171 A | 1/2002 |
| JP | 2003-092867 A | 3/2003 |
| JP | 2003-139129 A | 5/2003 |
| JP | 2003-244886 A | 8/2003 |
| JP | 2004-173377 A | 6/2004 |
| JP | 2005-016556 A | 1/2005 |
| JP | 2005-048890 A | 2/2005 |
| JP | 2005-155689 A | 6/2005 |
| JP | 2005-304290 A | 10/2005 |
| JP | 2006-226388 A | 8/2006 |
| JP | 2006-283773 A | 10/2006 |
| JP | 2007-024267 A | 2/2007 |
| JP | 2007-155093 A | 6/2007 |
| JP | 2009-041671 A | 2/2009 |
| JP | 2009-133361 A | 6/2009 |
| JP | 2009-136143 A | 6/2009 |
| WO | 20061120719 A1 | 11/2006 |

OTHER PUBLICATIONS

Yamada et al., "Fluid Dynamic Bearing Apparatus, Spindle Motor, and Disk Drive Apparatus," U.S. Appl. No. 13/299,542, filed Nov. 18, 2011.

Yamada et al., "Fluid Dynamic Bearing Apparatus, Spindle Motor, and Disk Drive Apparatus," U.S. Appl. No. 12/742,931, filed May 14, 2010.

Kimura et al., "Bearing Apparatus, Spindle Motor, and Disk Drive Apparatus," U.S. Appl. No. 12/791,147, filed Jun. 1, 2010.

Oe et al., "Bearing Apparatus, Spindle Motor, and Disk Drive Apparatus," U.S. Appl. 12/793,851, filed Jun. 4, 2010.

Yamada et al., "Fluid Dynamic Bearing Apparatus, Spindle Motor, and Disk Drive Apparatus," U.S. Appl. No. 12/899,658, filed Oct. 7, 2010.

Kimura et al., "Bearing Apparatus, Spindle Motor, and Disk Drive Apparatus", U.S. Appl. No. 12/791,147, filed Jun. 1, 2010.

Oe et al., "Bearing Apparatus, Spindle Motor, and Disk Drive Apparatus", U.S. Appl. No. 12/793,851, filed Jun. 4, 2010.

Yamada et al., "Fluid Dynamic Bearing Apparatus, Spindle Motor, and Disk Drive Apparatus", U.S. Appl. No. 12/742,931, filed May 14, 2010.

Fukushima, "Motor and Disk Drive Apparatus," U.S. Appl. 13/751,380, filed Jan. 28, 2013.

Yamada et al., "Fluid Dynamic Bearing Apparatus, Spindle Motor, and Disk Drive Apparatus", U.S. Appl. No. 13/299,542, filed Nov. 18, 2011.

Kimura et al., "Bearing Apparatus, Spindle Motor, and Disk Drive Apparatus", U.S. Appl. No. 13/602,420, filed Sep. 4, 2012.

Kimura et al., "Bearing Apparatus, Spindle Motor, and Disk Drive Apparatus", U.S. Appl. No. 13/681,500, filed Nov. 20, 2012.

Kimura et al., "Bearing Apparatus, Spindle Motor, and Disk Drive Apparatus", U.S. Appl. No. 13/602,348, filed Sep. 4, 2012.

Iwasaki et al., "Motor and Disk Drive Apparatus", U.S. Appl. No. 13/613,109, filed Sep. 13, 2012.

Tamaoka et al., "Motor and Disk Drive Apparatus", U.S. Appl. No. 13/613,106, filed Sep. 13, 2012.

Iwasaki et al., "Motor and Disk Drive Apparatus", U.S. Appl. No. 13/613,108, filed Sep. 13, 2012.

Sekii et al., "Spindle Motor and Disk Drive Apparatus", U.S. Appl. No. 13/767,205, filed Feb. 14, 2013.

Sekii et al., "Bearing Apparatus, Spindle Motor, and Disk Drive Apparatus", U.S. Appl. No. 13/789,796, filed Mar. 8, 2013.

Sekii et al., "Bearing Apparatus, Spindle Motor, and Disk Drive Apparatus", U.S. Appl. No. 13/790,089, filed Mar. 8, 2013.

Sato et al., "Spindle Motor and Disk Drive Apparatus", U.S. Appl. No. 13/798,857, filed Mar. 13, 2013.

Sekii, "Motor and Disk Drive Apparatus", U.S. Appl. No. 13/886,290, filed May 3, 2013.

Watanabe et al., "Spindle Motor and Disk Drive Apparatus", U.S. Appl. No. 13/898,921, filed May 21, 2013.

Kimura et al., "Bearing Mechanism, Motor, and Disk Drive Apparatus", U.S. Appl. No. 13/775,475, filed Feb. 25, 2013.

Sumiji et al., "Bearing Mechanism Motor, and Disk Drive Apparatus", U.S. Appl. No. 13/775,467, filed Feb. 25, 2013.

Sumiji et al., "Bearing Mechanism, Motor, and Disk Drive Apparatus", U.S. Appl. No. 13/785,297, filed Mar. 5, 2013.

English translation of Official Communication issued in International Patent Application No. PCT/JP2009/059556, mailed on Jan. 20, 2011.

* cited by examiner

DYNAMIC PRESSURE BEARING AND SPINDLE MOTOR USING THE SAME

BACKGROUND OF THE INVENTION

1. Field of the Invention

The present invention relates to a dynamic pressure bearing and a spindle motor including the same. The present invention also relates to an information recording apparatus including the spindle motor.

2. Description of the Related Art

Recently, there has been an increase in the demand for a reduction in size, an increase in storage capacity, and an increase in rotation rate of hard disk drives (HDDs). In order to meet this demand, bearing mechanisms in HDDs are now typically provided by dynamic pressure bearings rather than traditional ball bearings. In a dynamic pressure bearing, a dynamic pressure generating groove array provided in a so-called herringbone pattern is defined in at least one of a surface of a shaft and a bearing surface. In addition, the shaft and the bearing surface have a minute gap defined therebetween, and a lubricating fluid, such as oil, is arranged within this minute gap.

There has been a demand for a further reduction in size even in HDDs using such dynamic pressure bearings. A reduction in axial dimension is particularly demanded of the dynamic pressure bearings.

Techniques concerning fluid dynamic bearings are disclosed, for example, in JP-A2000-014079, JP-A2005-155689, JP-A2009-133361, and JP-A 2009-136143.

SUMMARY OF THE INVENTION

Dynamic pressure bearings according to preferred embodiments of the present invention include a communicating hole and at least one tapered seal. The dynamic pressure bearings are preferably constructed such that an opening angle of one of the at least one tapered seal through which oil feeding is possible is in a range of about 30 degrees inclusive to about 180 degrees exclusive, a tapered seal wall surface depth $W_1$ of the tapered seal is about 0.3 mm or more, and a sum of distances over which a lubricating oil fed into the bearing travels from both sides of an end portion of the communicating hole in a cross-section beyond a wall surface of the communicating hole along a wall surface opposite the end portion of the communicating hole exceeds an inside diameter of the communicating hole.

A dynamic pressure bearing according to a preferred embodiment of the present invention preferably includes a shaft arranged along a central axis extending in a vertical direction, and a sleeve portion arranged to support a circumference of the shaft.

The shaft and the sleeve portion are arranged to define a minute gap therebetween. At least one of an outer circumferential surface of the shaft and an inner circumferential surface of the sleeve portion has a radial dynamic pressure groove array defined therein. The sleeve portion includes a communicating hole defined therein, the communicating hole being arranged to be in communication with the minute gap. At least one tapered seal is preferably arranged in communication with the minute gap, the at least one tapered seal including a first tapered seal through which oil feeding is possible. The minute gap, the communicating hole, and the at least one tapered seal include a lubricating oil arranged therein.

An opening angle of $2\times\theta s_1$ of the first tapered seal is preferably in a range of about 30 degrees inclusive to about 180 degrees exclusive, for example. A tapered seal wall surface depth $W_1$ of the first tapered seal is preferably about 0.3 mm or more, for example. The following relationships are preferably satisfied:

$$S < 2q_2$$

$$q_2 = \frac{D_1 \cdot \tan\theta s_1 \cdot \cos(\theta s_2 + \beta_2)}{\sin\theta s_2 \cdot \cos(\theta s_1 + \beta_1)}$$

where S is an inside diameter of the largest imaginary circle inscribed in the communicating hole, $\beta_1$ is a contact angle between the lubricating oil and a wall surface of the first tapered seal, $\beta_2$ is a contact angle between the lubricating oil and a wall surface of the communicating hole, $2\times\theta s_1$ is the opening angle of the first tapered seal, $2\times\theta s_2$ is an angle defined between the wall surface of the communicating hole and a wall surface opposite an end portion of the communicating hole, $D_1$ is a tapered seal depth of the first tapered seal, and $q_2$ is a distance over which the lubricating oil has traveled beyond the wall surface of the communicating hole along the wall surface opposite the end portion of the communicating hole.

Preferred embodiments of the present invention provide dynamic pressure bearings which have a reduced axial dimension and which are constructed such that smooth feeding of a lubricating oil is possible, and also provide spindle motors including such a dynamic pressure bearing.

The above and other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of the present invention will be described below with reference to the accompanying drawings.

In a common dynamic pressure bearing, an opening angle of a tapered seal is generally about 20 degrees or less. Two principal beneficial effects of a small opening angle of the tapered seal are:

1) A reduced width of an oil surface in the tapered seal, which contributes to preventing a leakage of an oil when the tapered seal receives a shock or the like; and 2) An increased length of the tapered seal, which contributes to prolonging the time required for evaporation of the oil.

On the other hand, a small opening angle of the tapered seal may include the following two disadvantages:

1) The increased length of the tapered seal involves the tapered seal occupying a correspondingly large space in the dynamic pressure bearing, necessitating an increased thickness of the dynamic pressure bearing; and 2) Since an opening of the tapered seal serves as an oil hole, the small opening angle of the tapered seal means a small oil hole, which delays entry of the oil into the bearing at the time of lubrication.

The delayed entry of the oil into the bearing is caused by influence of surface tension of the oil both at the oil surface in the oil hole and at an oil surface inside the bearing.

Figure 1A:
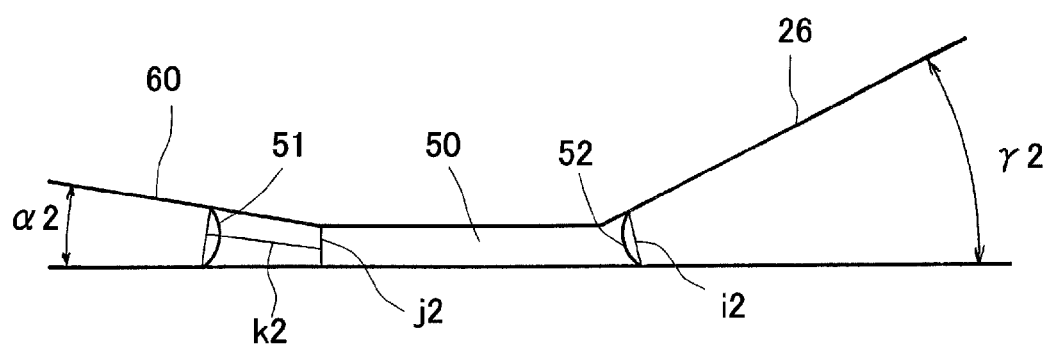
FIGS. 1A, 1B, and 1C are each a conceptual diagram illustrating a balance between oil surfaces.
Figure 1B:
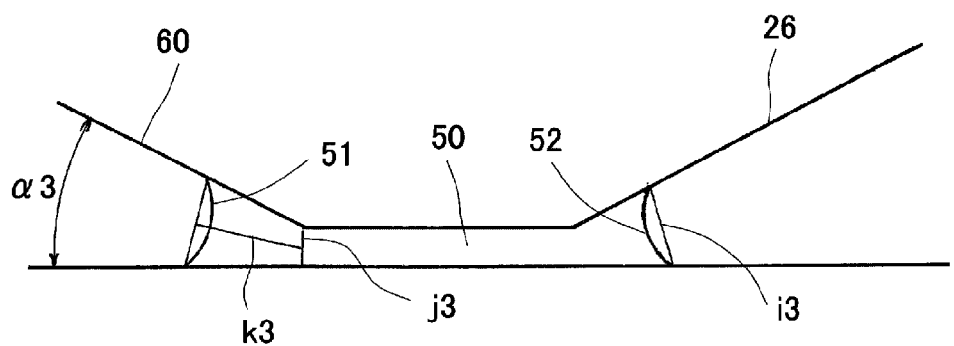
Figure 1C:
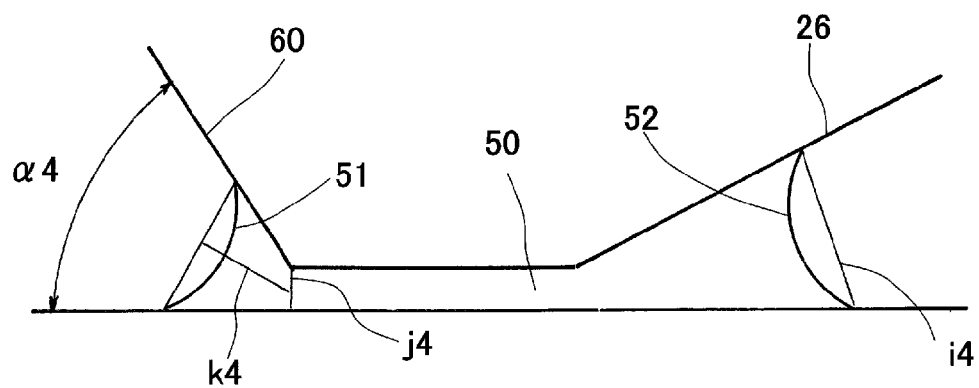

FIGS. 1A, 1B, and 1C are schematic diagrams illustrating a balance between oil surfaces of an oil 50 when the oil 50 is fed into a bearing through a tapered seal 60. In each schematic diagram, the oil hole is on the left-hand side while an inside of the bearing is on the right-hand side, and an oil surface 51 is provided in the oil hole while an oil surface 52 is provided in an opening 26 inside the bearing.

Based on the assumption that the influence of gravity is negligible, the oil surfaces are preferably arranged so as to balance each other when the radius of curvature of the oil surface in the oil hole and that of the oil surface inside the bearing are equal, or substantially equal, to each other. In dynamic pressure bearings according to preferred embodiments of the present invention, the surface tension is preferably so dominant that the influence of gravity is negligible. In the following investigations, the influence of gravity is therefore eliminated from consideration.

In FIG. 1A, an opening angle $\alpha_2$ of the tapered seal 60, which is on the oil hole side, is preferably about 10 degrees; an opening angle $\gamma_2$ of the opening 26 inside the bearing, in which a top of the oil 50 exists, is preferably about 30 degrees; a contact angle between the oil 50 and a wall surface is preferably about 10 degrees; a gap width $j_2$ is preferably about 0.3 mm; and a retained oil depth $k_2$ is preferably about 1.0 mm, for example. Then, the width $i_2$ of the oil surface 52 at the top of the oil 50 inside the bearing is preferably about 0.447 mm, for example.

In FIG. 1B, an opening angle $\alpha_3$ of the tapered seal 60 is preferably about 30 degrees, a gap width $j_3$ is preferably about 0.3 mm, and a retained oil depth $k_3$ is preferably about 1.0 mm, for example. Then, the width $i_3$ of the oil surface 52 at the top of the oil 50 inside the bearing is preferably about 0.846 mm, for example.

In FIG. 1C, an opening angle $\alpha_4$ of the tapered seal 60 is preferably about 60 degrees, a gap width $j_4$ is preferably about 0.3 mm, and a retained oil depth $k_4$ is preferably about 1.0 mm, for example. Then, the width $i_4$ of the oil surface 52 at the top of the oil 50 inside the bearing is preferably about 1.776 mm, for example.

FIGS. 1A, 1B, and 1C show that as the opening angle of the tapered seal 60 on the oil hole side increases, the width of the oil surface 52 at the top of the oil 50 inside the bearing also increases, so that and the oil 50 becomes capable of smoothly entering into even a large gap.

Regarding a tubular structure having two tapered seals, it is desirable that an opening angle of one tapered seal be relatively large while an opening angle of the other tapered seal is relatively small, in view of space saving, impact resistance, and an oil evaporation time. Reasons for this will now be described below.

Figure 2:
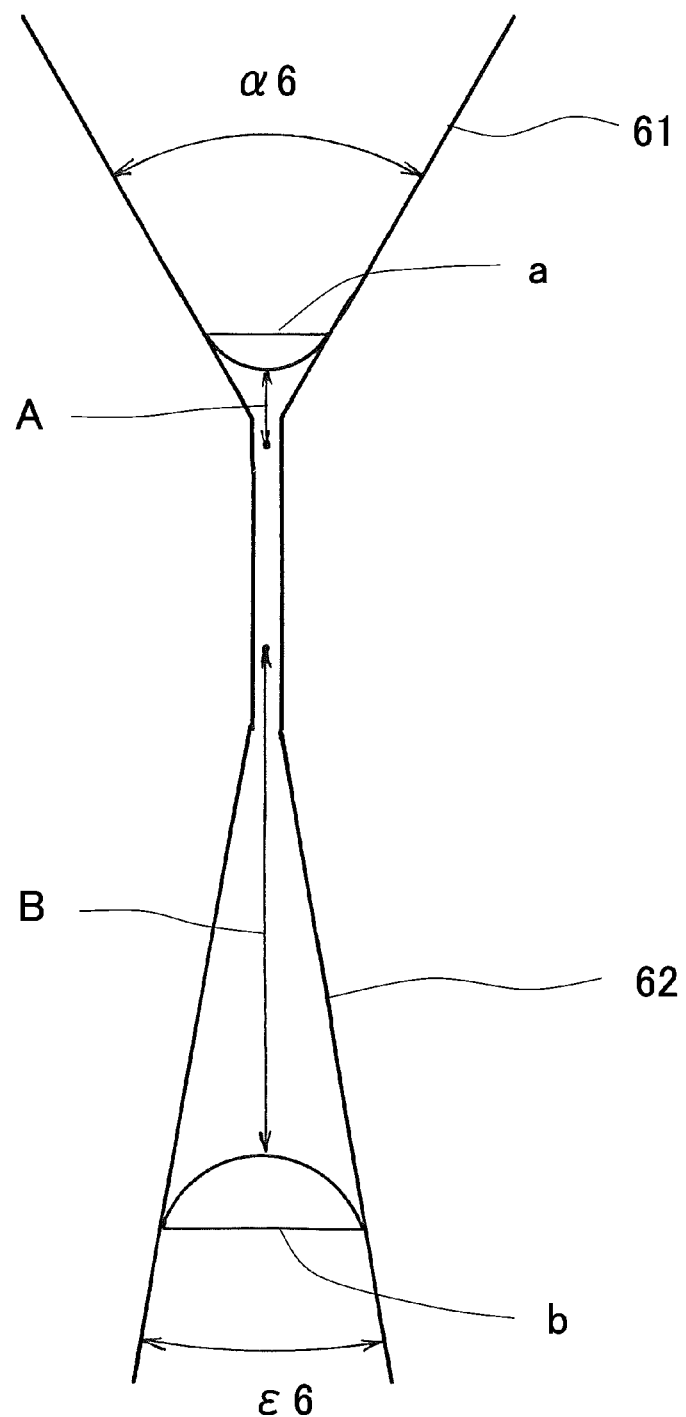
FIG. 2 is a conceptual diagram illustrating a balance between oil surfaces in tapered seals.

FIG. 2 is a schematic diagram illustrating a tubular structure having two tapered seals, in which a first tapered seal 61 preferably has a large opening angle $\alpha 6$ while a second tapered seal 62 preferably has a small opening angle $\epsilon 6$. As is shown in FIG. 2, there is a significant difference between the opening angle of the first tapered seal 61 and the opening angle of the second tapered seal 62. In this case, due to the surface tension acting on each oil surface, an oil buffer depth A of the first tapered seal 61 is preferably smaller than an oil buffer depth B of the second tapered seal 62.

The term "oil buffer depth" as used herein is preferably defined as the distance between a point of intersection of imaginary extension lines of a wall surface of a tapered seal, and a point of intersection of an oil surface with a bisector of an angle defined between the imaginary extension lines.

The "opening angle" of a tapered seal is preferably defined as an angle between tangents to the largest circle inscribed in a wall surface of the tapered seal in a cross-section taken along a plane including a rotation axis. According to this definition, in the case where a wall surface of a tapered seal is represented by straight lines in a cross-section, the opening angle of the tapered seal corresponds to an angle defined between these straight lines. The above definition of the "opening angle" also holds for such tapered seals as illustrated in FIGS. 14A, 14B, 14C, and 14D, a wall surface of which is not represented by simple straight lines but by bent lines or curved lines in a cross-section. In the case where there is a difference between the opening angle of one tapered seal and the opening angle of the other tapered seal as in the tubular structure illustrated in FIG. 2, the width a of the oil surface in the first tapered seal 61 and the width b of the oil surface in the second tapered seal 62 satisfy this relationship: a<b. That is, the width a of the oil surface in the first tapered seal 61 is relatively small, and the amount of oil retained in the first tapered seal 61 is accordingly relatively small. This produces the following three beneficial effects:

1) Oil splashing can be prevented even if the first tapered seal 61 receives a shock;

2) Because the area of the oil surface in the first tapered seal 61 is also relatively small, the evaporation of the oil therethrough is reduced; and 3) Because the oil buffer depth A is relatively small, a space for the first tapered seal 61 can be reduced.

Dynamic pressure bearings according to preferred embodiments of the present invention can make smooth oil feeding possible even when a tapered seal on the oil hole side has a small depth. Details thereof will now be described below with reference to the accompanying drawings and using mathematical expressions.

Figure 3:
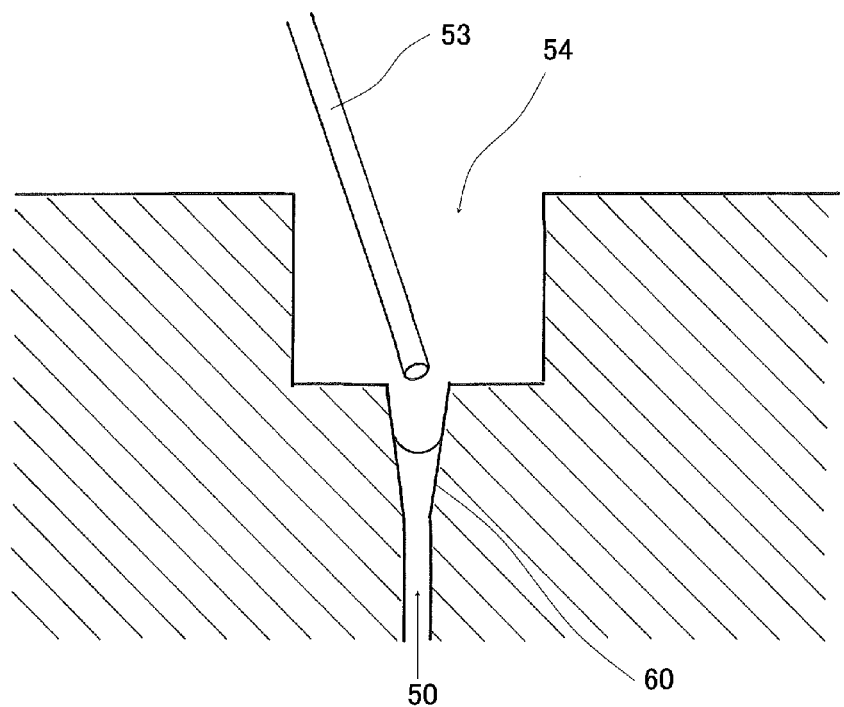
FIG. 3 is a cross-sectional view of an oil hole and its vicinity.

FIG. 3 is a schematic diagram illustrating how oil feeding is carried out in a common practice. A small depth of a tapered seal 60 on the oil hole side means a small volume of the tapered seal 60. Referring to FIG. 3, if an oil 50 does not smoothly enter into the bearing when the oil 50 is fed through a needle 53, an additional space 54 in which to store the oil 50 needs to be arranged above the tapered seal 60.

In the case where the provision of such an additional space is impossible, in order to prevent an overflow of the oil, it is necessary to spend a long time completing the oil feeding, or to carry out an oil feeding operation multiple times to complete the whole oil feeding. In either case, the time required to complete the oil feeding will be increased. In the case where a smooth entry of the oil into the bearing is possible, the oil feeding can be completed in a short time without the need for an additional space in which to store the oil. Therefore, when there is a desire to reduce the axial dimension of a dynamic pressure bearing, a smooth entry of the oil into the bearing is important.

Figure 4:
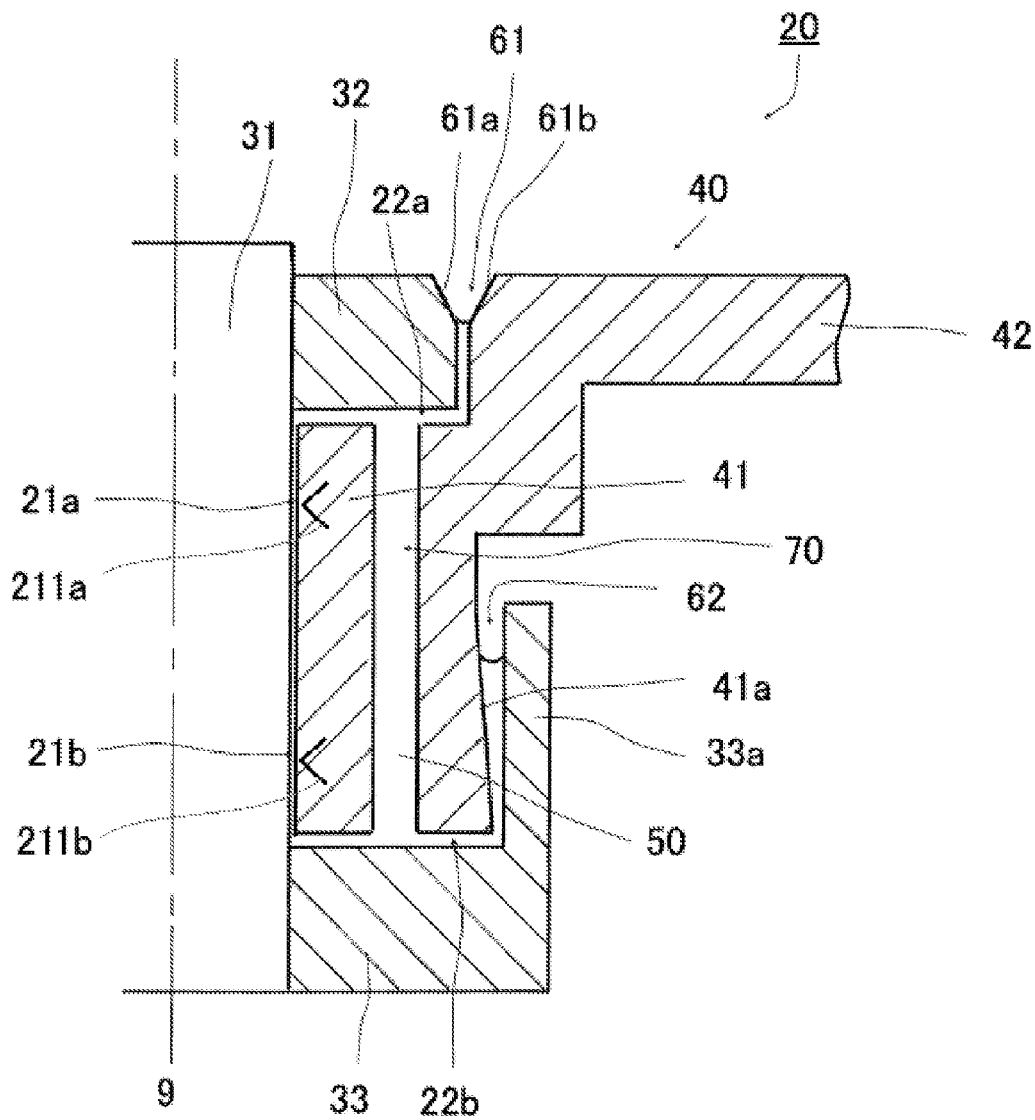
FIG. 4 is a partial cross-sectional view of a dynamic pressure bearing of a fixed shaft type according to a preferred embodiment of the present invention.

FIG. 4 is a partial cross-sectional view of a dynamic pressure bearing 20 of a fixed shaft type according to a preferred embodiment of the present invention. An oil 50 is preferably fed into the dynamic pressure bearing 20 through a tapered seal 61, which serves as an oil hole. A smooth entry of the oil 50 into the dynamic pressure bearing 20 necessitates an entry of the oil 50 into a communicating hole 70 defined in the bearing 20. This is because the oil 50 is able to enter into the communicating hole 70 more easily than into a minute gap at radial dynamic pressure portions 21a and 21b respectively including radial dynamic pressure groove arrays 211a and 211b, because the inside diameter of the communicating hole 70 is significantly greater than the diameter of the minute gap at the radial dynamic pressure portion 21a and 21b. Therefore, if conditions for a smooth entry of the oil 50 into the communicating hole 70 are fulfilled, this means that the oil 50 can smoothly enter into the bearing 20 to spread throughout an inside of the bearing 20. The smooth entry of the oil 50 into the communicating hole 70 requires that several conditions be fulfilled. These conditions will now be described below.

Figure 5A:
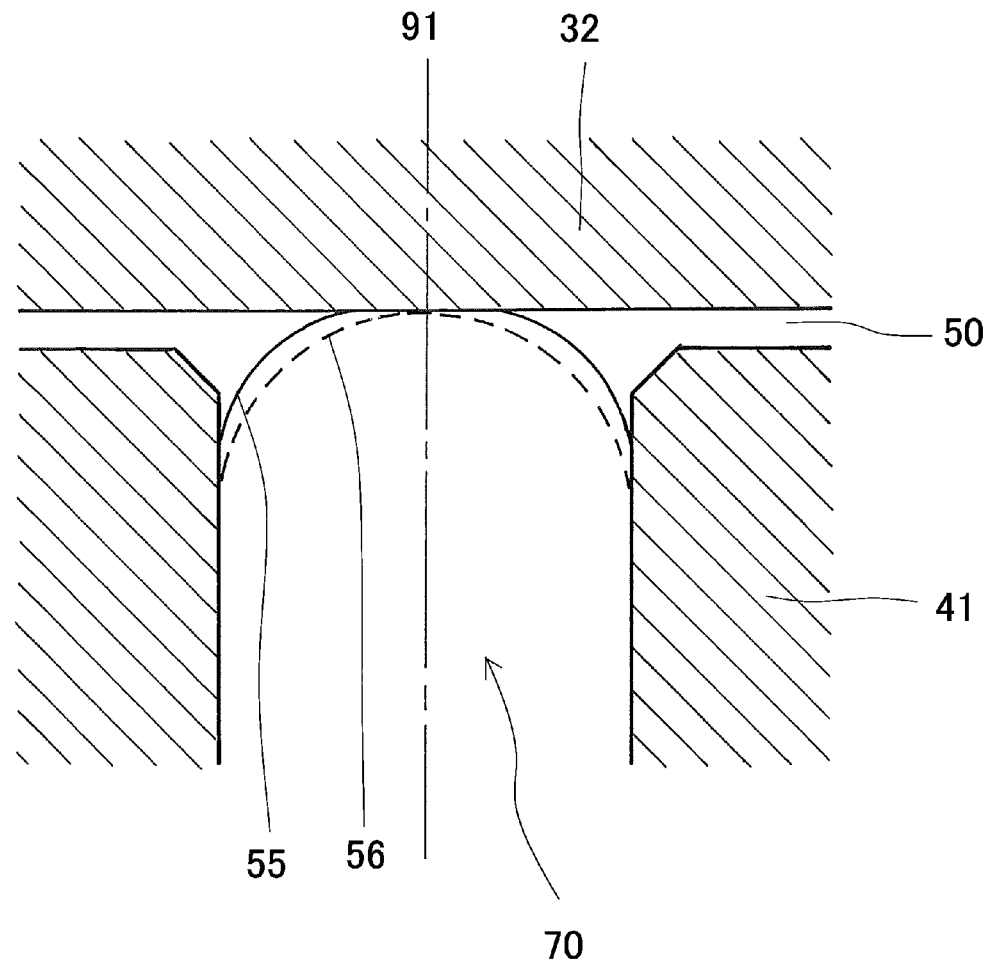
FIGS. 5A and 5B are each a vertical cross-sectional view of a communicating hole according to a preferred embodiment of the present invention.

FIG. 5A is a diagram illustrating a situation in which the oil 50 has begun entering into an end portion of the communicating hole 70 of the dynamic pressure bearing 20 illustrated in FIG. 4 at the time of the oil feeding. A balance is maintained with oil surfaces preferably being formed at positions represented by a solid line 55. The oil 50 will not enter into the communicating hole 70 with the oil surfaces continuing to stay at the positions represented by the solid line 55, before the oil surfaces arrive at a center line 91, i.e., positions represented by a broken line 56.

Figure 5B:
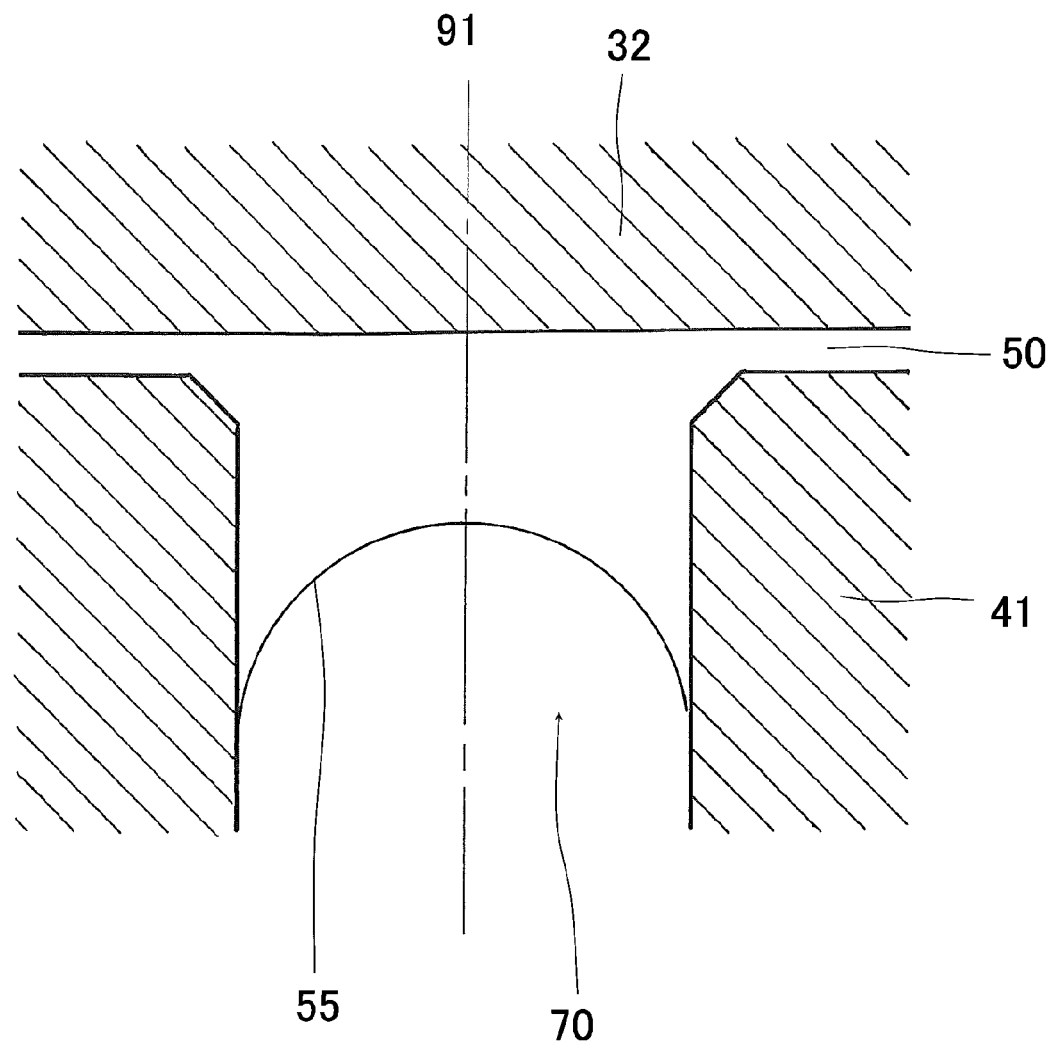

In order to allow the oil 50 to enter into the communicating hole 70, the oil surfaces have to reach the positions represented by the broken line 56. Once the oil surfaces reach the positions represented by the broken line 56, so that the oil surfaces, coming from around the communicating hole 70, join to define an annular shape, the oil 50 starts entering into the communicating hole 70, resulting in a state illustrated in FIG. 5B. At this time, an opening angle inside the communicating hole 70 can be regarded as 0 degrees, and a balance between the oil surfaces allows the oil 50 to travel smoothly through the communicating hole 70 toward a far end thereof. At the far end of the communicating hole 70, the oil 50 preferably joins a portion of the oil 50 which has traveled through the radial dynamic pressure portion 21a and 21b, having a clearance space of several micrometers, and a thrust dynamic pressure portions 21a and 21b, so that the oil 50 is arranged throughout the dynamic pressure bearing 20 (see FIG. 4).

Creating a condition in which the oil surfaces can pass the positions represented by the broken line 56 illustrated in FIG. 5A therefore suffices to allow the oil 50 to smoothly spread throughout the inside of the bearing 20.

Geometric models of the shapes of the oil surfaces were studied in order to examine the condition for allowing the oil to smoothly enter into the bearing. Based on the assumption that the tapered seal on the oil hole side is filled with the oil, models of the shapes of an oil surface on the oil hole side and an oil surface on the communicating hole side when the two oil surfaces balance each other were created. The aforementioned condition was assumed because the oil entry is most smoothly achieved under that condition.

Figure 6:
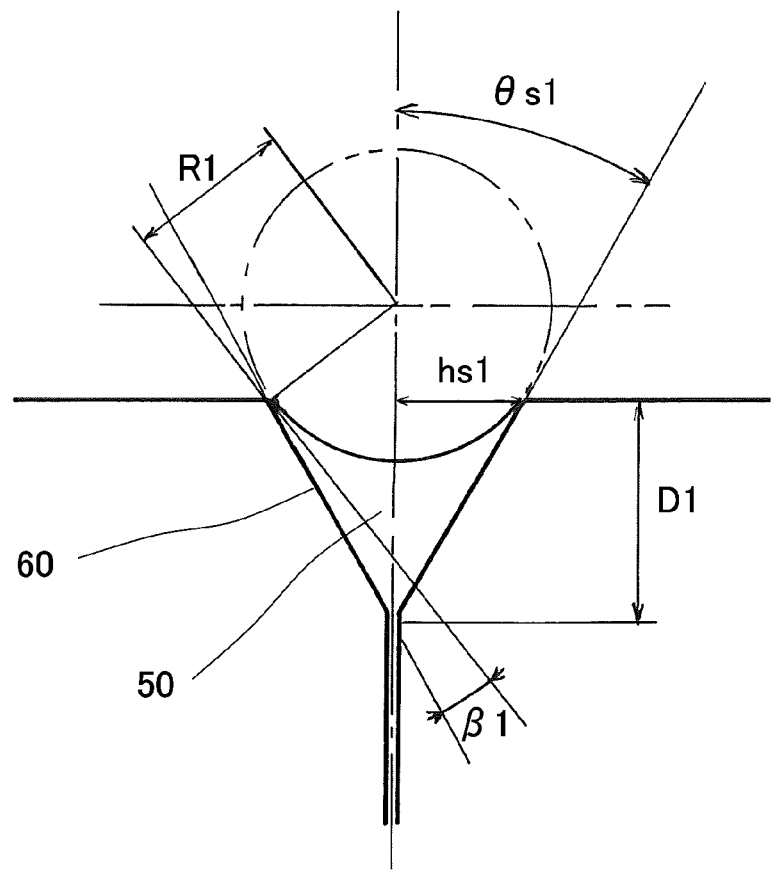
FIG. 6 is a cross-sectional view of a tapered seal on an oil hole side and its vicinity according to a preferred embodiment of the present invention.
Figure 7:
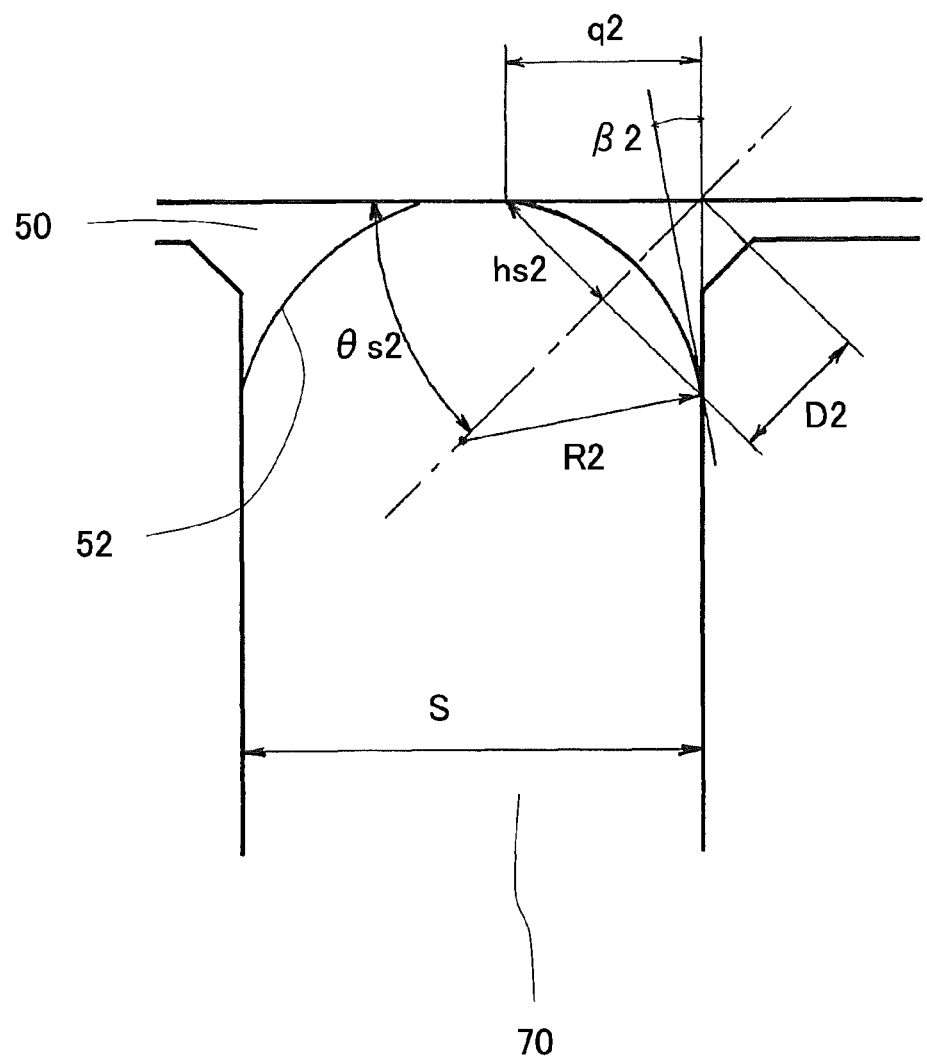
FIGS. 7 and 8 are each a cross-sectional view of a communicating hole and its vicinity according to a preferred embodiment of the present invention.

FIG. 6 is a diagram illustrating a geometric model of the oil surface on the oil hole side in the bearing 20 illustrated in FIG. 4. FIG. 7 is a diagram illustrating a geometric model of the oil surface on the communicating hole side in the bearing 20 illustrated in FIG. 4.

Suppose that an axially symmetric tubular structure is filled with an oil, and that the influence of gravity is negligible. In this case, oil surfaces at both ends of the oil inside the tubular structure generally balance each other in a state of equilibrium when the radius of curvature of both the oil surfaces is the same. In the following investigations, it is assumed that the influence of gravity is negligible. When the influence of gravity is eliminated from consideration, the balance between the oil surfaces illustrated in FIGS. 6 and 7, respectively, are expressed by Exp. (1) below, representing that the radius of curvature of the oil surfaces is the same:

$$\frac{hs_1}{\cos(\theta s_1 + \beta_1)} = \frac{hs_2}{\cos(\theta s_2 + \beta_2)} = (R_1 = R_2) \qquad \text{Exp. (1)}$$

where $hs_2$ and $hs_2$ denote a half of the width of the respective oil surfaces, $R_1$ and $R_2$ denote the radius of curvature of the respective oil surfaces, $\theta s_1$ denotes a half of the opening angle of the tapered seal, $\theta s_2$ denotes a half of an opening angle in the communicating hole, and $\beta_1$ and $\beta_2$ denote contact angles between the oil and wall surfaces.

Here, a distance (i.e., an "oil entry distance") $q_2$ over which the oil has traveled beyond the wall surface of the communicating hole along a wall surface opposite an end portion of the communicating hole is given by Exp. (2) below. Note that this distance $q_2$ also means a distance between a point of intersection of the wall surface opposite the end portion of the communicating hole with an extension of the wall surface of the communicating hole and the farthest end of the oil surface.

$$q_2 = \frac{hs_1 \cdot \cos(\theta s_2 + \beta_2)}{\sin\theta s_2 \cdot \cos(\theta s_1 + \beta_1)} \qquad \text{Exp. (2)}$$

where $q_2$ denotes the distance over which the oil has traveled beyond the wall surface of the communicating hole along the wall surface opposite the end portion of the communicating hole, $\theta s_2$ denotes a half of the width of the oil surface in the tapered seal, $\theta s_1$ denotes a half of the opening angle in the communicating hole, $\theta s_2$ denotes a half of the opening angle of the tapered seal, and $\beta_1$ and $\beta_2$ denote the contact angles between the oil and the wall surfaces.

Figure 8:
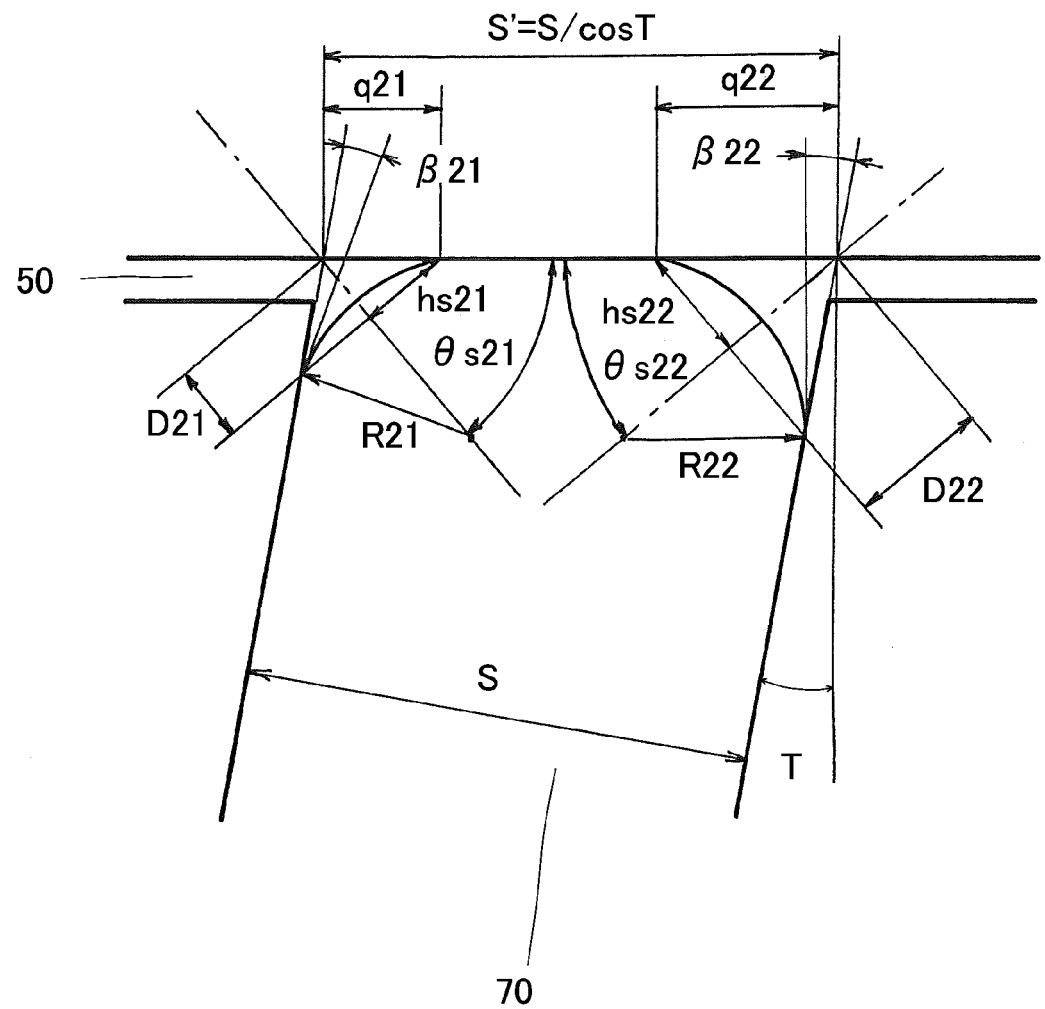

FIG. 8 is a diagram illustrating a geometric model of oil surfaces in the case where the communicating hole is arranged to extend obliquely with respect to surfaces defining a radially spreading minute gap. Referring to FIG. 8, considering the balance between the oil surfaces, distances (i.e., oil entry distances) $q_{21}$ and $q_{22}$ over which the oil has traveled beyond the wall surface of the communicating hole along the wall surface opposite the end portion of the communicating hole are given by Exps. (3) and (4) below, respectively.

$$q_{2_1} = \frac{hs_1 \cdot \cos(\theta s_{21} + \beta_{21})}{\sin\theta s_{21} \cdot \cos(\theta s_1 + \beta_1)} \qquad \text{Exp. (3)}$$

where $q_{21}$ denotes the distance over which the oil has traveled beyond the wall surface of the communicating hole along the wall surface opposite the end portion of the communicating hole, $hs_1$ denotes a half of the width of the oil surface in the tapered seal, $\theta s_{21}$ denotes a half of an opening angle in the communicating hole, $\beta_{21}$ and $\beta_1$ denote contact angles between the oil and the wall surfaces, and $\theta s_1$ denotes a half of the opening angle of the tapered seal.

$$q_{2_2} = \frac{hs_1 \cdot \cos(\theta s_{22} + \beta_{22})}{\sin\theta s_{22} \cdot \cos(\theta s_1 + \beta_1)} \qquad \text{Exp. (4)}$$

where $q_{22}$ denotes the distance over which the oil has traveled beyond the wall surface of the communicating hole along the wall surface opposite the end portion of the communicating hole, $hs_1$ denotes a half of the width of the oil surface in the tapered seal, $\theta s_{22}$ denotes a half of an opening angle in the communicating hole, $\beta_{22}$ and $\beta_1$ denote contact angles between the oil and the wall surfaces, and $\theta s_1$ denotes a half of the opening angle of the tapered seal.

Here, the condition for allowing the oil to smoothly enter into the bearing is expressed as Exp. (5) or (6) below, using S or S', denoting the inside diameter of the communicating hole. Note that S' is given by $S'=S/\cos T$, where T denotes a slant angle of the communicating hole with respect to a line substantially perpendicular to the surfaces defining the radially spreading minute gap.

$$S < 2q_2 \qquad \text{Exp. (5)}$$

$$S' < q_{21} + q_{22} \, (S' = S/\cos T) \qquad \text{Exp. (6)}$$

Here, the symbols used in FIGS. 6, 7, and 8 will be described below.

$R_{21}$ and $R_{22}$ denote the radius of curvature of the oil surfaces, $D_1$ denotes a tapered seal depth, $D_2$, $D_{21}$, and $D_{22}$ denote the height of the respective oil surfaces in the communicating hole, and T denotes the slant angle of the communicating hole with respect to the line substantially perpendicular to the surfaces defining the radially spreading minute gap.

Note that the "tapered seal depth" of a tapered seal corresponds to the height of an oil surface therein relative to a bottom of the tapered seal when the tapered seal is entirely filled with an oil.

Exps. (5) and (6) depend on the width ($2 \times hs_1$) of the oil surface on the oil hole side, the opening angle ($2 \times \theta s_1$) of the tapered seal on the oil hole side, the contact angles ($\beta_1$ and $\beta_2$ ($\beta_{21}$ and $\beta_{22}$)) between the oil and the wall surfaces, the opening angles ($2 \times \theta s_2$ ($2 \times \theta s_{21}$ and $2 \times \theta s_{22}$)) in the communicating hole, the inside diameter S of the communicating hole, and the slant angle T of the communicating hole.

The width ($2 \times hs_1$) of the oil surface on the oil hole side can be calculated based on the tapered seal depth $D_1$ and the opening angle of the tapered seal. It can therefore be said that Exps. (5) and (6) depend on the tapered seal depth $D_1$, the opening angle ($2 \times \theta s_1$) of the tapered seal on the oil hole side, the contact angles ($\beta_1$ and $\beta_2$ ($\beta_{21}$ and $\beta_{22}$)) between the oil and the wall surfaces, the opening angles ($2 \times \theta s_2$ ($2 \times \theta s_{21}$ and $2 \times \theta s_{22}$)) in the communicating hole, the inside diameter S of the communicating hole, and the slant angle T of the communicating hole.

Exps. (2), (3), and (4) can therefore be rewritten as Exps. (7), (8), and (9) below, respectively.

$$q_2 = \frac{D_1 \cdot \tan\theta s_1 \cdot \cos(\theta s_2 + \beta_2)}{\sin\theta s_2 \cdot \cos(\theta s_1 + \beta_1)} \qquad \text{Exp. (7)}$$

$$q_{21} = \frac{D_1 \cdot \tan\theta s_1 \cdot \cos(\theta s_{21} + \beta_{21})}{\sin\theta s_{21} \cdot \cos(\theta s_1 + \beta_1)} \qquad \text{Exp. (8)}$$

$$q_{22} = \frac{D_1 \cdot \tan\theta s_1 \cdot \cos(\theta s_{22} + \beta_{22})}{\sin\theta s_{22} \cdot \cos(\theta s_1 + \beta_1)} \qquad \text{Exp. (9)}$$

From the foregoing investigations, it is now apparent that smooth entry of the oil into the bearing is possible when Exp. (5) with Exp. (7) substituted thereinto holds, or when both Exp. (6) with Exp. (8) substituted thereinto and Exp. (6) with Exp. (9) substituted thereinto hold.

Relationships between the inside diameter of the communicating hole and a threshold value of the opening angle of the tapered seal on the oil hole side which makes Exp. (5) or Exp. (6) hold, so that the oil is allowed to smoothly enter into the bearing, were studied. The study will now be described below.

Firstly, studies were made about cases where the communicating hole is arranged to extend perpendicularly to the surfaces defining the radially spreading minute gap, and cases where the communicating hole is arranged to extend obliquely (with T=30 degrees) with respect to the surfaces defining the radially spreading minute gap, when the contact angles between the oil and the wall surfaces are 10 degrees ($\beta_1 = \beta_2 = \beta_{21} = \beta_{22}$).

Threshold values were calculated of the opening angle of the tapered seal which make Exp. (5) or Exp. (6) hold when the inside diameter S of the communicating hole takes values of 0.45, 0.6, 0.8, 1.0, 1.5, and 2.0 [mm], and the tapered seal depth $D_1$ takes values of 0.4, 0.6, 0.8, and 1.0 [mm]. Table 1A below shows calculation results in the cases where the communicating hole is arranged to extend perpendicularly to the surfaces defining the radially spreading minute gap. Table 1B below shows calculation results in the cases where the communicating hole is arranged to extend obliquely (with T=30 degrees) with respect to the surfaces defining the radially spreading minute gap.

TABLE 1A

| | $D_1$ [mm] | | | |
|---|---|---|---|---|
| S [mm] | 0.4 | 0.6 | 0.8 | 1.0 |
| 0.45 | 57.0 | 43.0 | 34.3 | 28.4 |
| 0.60 | 67.5 | 52.8 | 43.0 | 36.2 |
| 0.80 | 78.0 | 63.2 | 52.8 | 45.1 |
| 1.00 | 85.8 | 71.4 | 60.8 | 52.8 |

TABLE 1A-continued

| | $D_1$ [mm] | | | |
|---|---|---|---|---|
| S [mm] | 0.4 | 0.6 | 0.8 | 1.0 |
| 1.50 | 99.1 | 85.8 | 75.6 | 67.5 |
| 2.00 | 107.5 | 95.4 | 85.8 | 78.0 |

TABLE 1B

| | $D_1$ [mm] | | | |
|---|---|---|---|---|
| S [mm] | 0.4 | 0.6 | 0.8 | 1.0 |
| 0.45 | 56.0 | 42.1 | 33.5 | 27.7 |
| 0.60 | 66.5 | 51.8 | 42.1 | 35.3 |
| 0.80 | 76.9 | 62.1 | 51.8 | 44.2 |
| 1.00 | 84.8 | 70.3 | 59.8 | 51.8 |
| 1.50 | 98.2 | 84.8 | 74.6 | 66.5 |
| 2.00 | 106.7 | 94.5 | 84.8 | 76.9 |

It is apparent from the results shown in Table 1A that the greater the inside diameter S of the communicating hole becomes, the greater the minimum necessary value of the opening angle of the tapered seal becomes. It is also apparent that the greater the tapered seal depth $D_1$ becomes, the smaller the minimum necessary value of the opening angle of the tapered seal becomes. It is also apparent that under some conditions, the oil is able to smoothly enter into the bearing when the opening angle of the tapered seal is 30 degrees. Specifically, in the case where the tapered seal depth $D_1$ is 1.0 mm and the inside diameter S of the communicating hole is 0.45 mm, the oil is able to smoothly enter into the bearing when the opening angle of the tapered seal is 30 degrees.

Comparing the results shown in Table 1A and the results shown in Table 1B makes it apparent that, for every pair of values of the inside diameter S of the communicating hole and the tapered seal depth $D_1$, the aforementioned threshold value of the opening angle of the tapered seal differs by only about one degree between the case where the communicating hole is arranged to extend perpendicularly to the surfaces defining the radially spreading minute gap and the case where the communicating hole is arranged to extend obliquely (with T=30 degrees) with respect to the surfaces defining the radially spreading minute gap. This shows that a slant of the communicating hole hardly affects the threshold value of the opening angle of the tapered seal.

Hereinafter, investigations will therefore be made only concerning the cases where the communicating hole is arranged to extend perpendicularly to the surfaces defining the radially spreading minute gap.

For different values of the contact angles ($\beta_1 = \beta_2$) between the oil and the wall surfaces, investigations will be made as to relationships between the inside diameter of the communicating hole and the threshold value of the opening angle of the tapered seal on the oil hole side which allows the oil to smoothly enter into the bearing.

Threshold values were calculated of the opening angle of the tapered seal which make Exp. (5) hold when the inside diameter S of the communicating hole takes values of 0.45, 0.6, 0.8, 1.0, 1.5, and 2.0 [mm], and the tapered seal depth $D_1$ takes values of 0.4, 0.6, 0.8, and 1.0 [mm]. The contact angles between the oil and the wall surfaces were set to 0 degrees, 5 degrees, and 20 degrees. Table 2A below shows calculation results in the case where the contact angles are 0 degrees. Table 2B below shows calculation results in the case where the contact angles are 5 degrees. Table 2C below shows calculation results in the case where the contact angles are 20 degrees.

TABLE 2A

| | ($\beta_1 = \beta_2 = 0$ [deg]) | | | |
|---|---|---|---|---|
| | $D_1$ [mm] | | | |
| S [mm] | 0.4 | 0.6 | 0.8 | 1.0 |
| 0.45 | 53.4 | 38.9 | 30.4 | 24.8 |
| 0.60 | 64.7 | 48.9 | 38.9 | 32.2 |
| 0.80 | 76.4 | 60.0 | 48.9 | 41.1 |
| 1.00 | 85.2 | 69.0 | 57.5 | 48.9 |
| 1.50 | 100.4 | 85.2 | 73.7 | 64.7 |
| 2.00 | 110.1 | 96.2 | 85.2 | 76.4 |

TABLE 2B

| | ($\beta_1 = \beta_2 = 5$ [deg]) | | | |
|---|---|---|---|---|
| | $D_1$ [mm] | | | |
| S [mm] | 0.4 | 0.6 | 0.8 | 1.0 |
| 0.45 | 55.1 | 40.9 | 32.2 | 26.5 |
| 0.60 | 66.0 | 50.8 | 40.9 | 34.0 |
| 0.80 | 77.1 | 61.5 | 50.8 | 43.0 |
| 1.00 | 85.5 | 70.1 | 59.1 | 50.8 |
| 1.50 | 99.8 | 85.5 | 74.7 | 66.1 |
| 2.00 | 108.9 | 95.8 | 85.5 | 77.1 |

TABLE 2C

| | ($\beta_1 = \beta_2 = 20$ [deg]) | | | |
|---|---|---|---|---|
| | $D_1$ [mm] | | | |
| S [mm] | 0.4 | 0.6 | 0.8 | 1.0 |
| 0.45 | 67.5 | 48.4 | 39.7 | 33.6 |
| 0.60 | 70.9 | 57.7 | 48.4 | 41.6 |
| 0.80 | 79.9 | 67.1 | 57.7 | 50.5 |
| 1.00 | 86.5 | 74.3 | 65.0 | 57.7 |
| 1.50 | 97.4 | 86.5 | 77.9 | 70.9 |
| 2.00 | 104.2 | 94.4 | 86.5 | 79.9 |

From the above results, it is apparent that a change in the contact angles between the oil and the wall surfaces does not make a significant difference in the condition for allowing the oil to smoothly enter into the bearing.

The contact angles between the oil and the wall surfaces in dynamic pressure bearings according to preferred embodiments of the present invention are generally about 10 degrees. The oil entry distance $q_2$ may therefore be calculated based on Exp. (7) on the assumption that the contact angles $\beta_1$ and $\beta_2$ between the oil and the wall surfaces are 10 degrees. Note that the contact angle between an oil and a wall surface can be determined by dropping an appropriate amount of oil onto a flat board made of the same material as that of the wall surface, and measuring the angle that the oil droplet makes with the flat board at a position at which a boundary between the oil and air intersects with the flat board when viewed from the side. Note that the appropriate amount of the oil is any amount that keeps the influence of gravity from deforming the oil droplet, that is, any amount that allows the influence of gravity to be negligible.

A summary description about the opening angle of the tapered seal on the oil hole side will now be given below. In view of allowing the oil to smoothly enter into the bearing, greater opening angles of the tapered seal on the oil hole side are preferable. It is, however, sufficient for the opening angle of the tapered seal on the oil hole side to be a minimum of about 30 degrees in order to allow the oil to smoothly enter into the bearing, although desirable values of the opening angle of the tapered seal vary depending on conditions such as the inside diameter S of the communicating hole, the tapered seal depth $D_1$, the contact angles between the oil and the wall surfaces, and so on. The opening angle of the tapered seal is more preferably about 40 degrees or more, still more preferably about 50 degrees or more, and still more preferably about 60 degrees or more, for example.

On the other hand, too great of an opening angle of the tapered seal should be avoided, because that would nullify the tapered seal, or make the width $2hs_1$ of a top end of the opening of the tapered seal excessively great compared with the tapered seal depth $D_1$. Therefore, the opening angle of the tapered seal should be less than about 180 degrees, and in view of structural limitations of the dynamic pressure bearing, the opening angle of the tapered seal is preferably about 160 degrees or less, and more preferably about 140 degrees or less. Furthermore, the opening angle of the tapered seal may be about 120 degrees or less, about 100 degrees or less, or about 90 degrees or less.

Tapered seals often have a chamfer defined along a corner portion thereof. Dynamic pressure bearings according to preferred embodiments of the present invention are preferably different from those dynamic pressure bearings whose tapered seal through which an oil is fed thereinto has a simple chamfer defined along a corner portion thereof. The width of such a chamfer preferably is generally about 0.2 mm, for example.

In dynamic pressure bearings according to preferred embodiments of the present invention, a sufficient volume of an inner space of the tapered seal needs to be secured, considering the amount of oil to be fed into the bearing and the amount of oil that is able to enter into the bearing per unit time. An oil used in dynamic pressure bearings according to preferred embodiments of the present invention preferably includes a kinematic viscosity of about 60 mm²/s or less at a temperature of about 40° C., for example. When an oil having such a small kinematic viscosity is used, it may be difficult to control the rate of oil feeding to be sufficiently low. In that case, if a "tapered seal wall surface depth" $W_1$ is small, shortening a period when Exp. (5) is satisfied, a portion of the oil may flow out of the inner space of the tapered seal before entering into the bearing. The tapered seal wall surface depth $W_1$ therefore needs to be about 0.3 mm or more.

Figure 9:
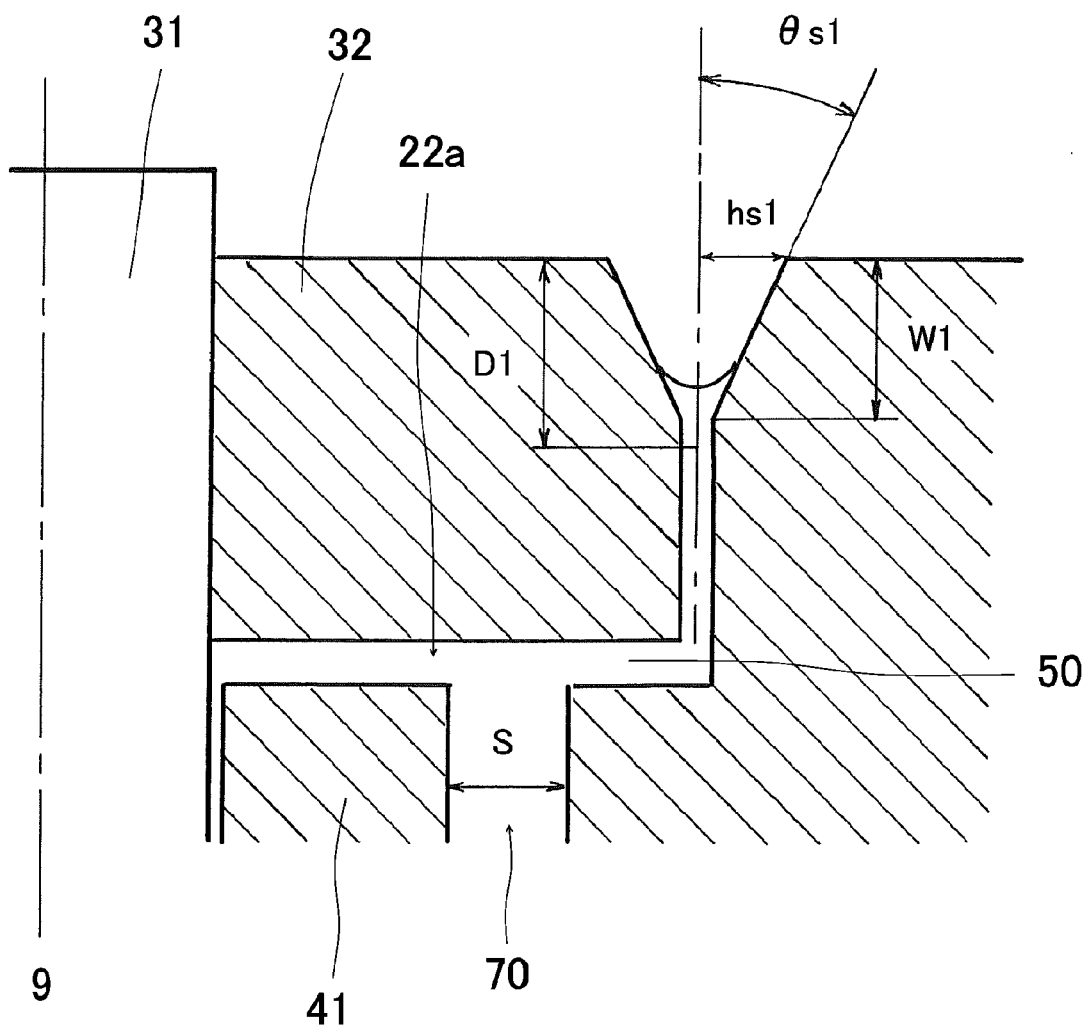
FIG. 9 is a cross-sectional view of a tapered seal on the oil hole side and its vicinity according to a preferred embodiment of the present invention.

Referring to FIG. 9, the "tapered seal wall surface depth" $W_1$ refers to a distance over which the wall surface of the tapered seal covers in a direction in which the tapered seal depth $D_1$ is defined.

Dynamic pressure bearings according to preferred embodiments of the present invention are configured to allow the oil to smoothly enter thereinto, and therefore do not need to be provided with the space 54 in which to store the oil. The volume of the tapered seal may therefore be smaller than the volume of the oil fed into the dynamic pressure bearings.

The foregoing considerations show that dynamic pressure bearings according to preferred embodiments of the present invention should be designed such that Exp. (5) or Exp. (6) holds and that the tapered seal wall surface depth $W_1$ is about 0.3 mm or more, in order to allow the oil to smoothly enter into the bearings at the time of the oil feeding.

Note that the tapered seal wall surface depth $W_1$ is preferably about 5 mm or less, and more preferably about 3 mm or less, because of structural limitations of the dynamic pressure bearings.

Beneficial effects of various preferred embodiments of the present invention are striking when the tapered seal depth $D_1$ is about 1.0 mm or less. Moreover, great beneficial effects of preferred embodiments of the present invention are produced when the inside diameter of the communicating hole is relatively large, e.g., 0.45 mm or more, because the smooth entry of the oil into the bearing is achieved when Exp. (5) with Exp. (7) substituted thereinto is satisfied.

Accordingly, it is now assumed that the tapered seal depth $D_1$ is 1.0 mm or less, and that the inside diameter S of the communicating hole is 0.45 mm or more, for example. Based on this assumption, a smooth feeding of the oil is possible when Exp. (5) is satisfied and the opening angle of the tapered seal on the oil hole side is in the range of about 30 degrees inclusive to about 180 degrees exclusive. As described above, the specific threshold values of the opening angle of the tapered seal on the oil hole side which allow the smooth feeding of the oil are determined based on the inside diameter S of the communicating hole, the contact angles ($\beta_1$, $\beta_2$, $\beta_{21}$, and $\beta_{22}$) between the oil and the wall surfaces, the tapered seal depth $D_1$, and the opening angle ($2 \times \theta s_1$) of the tapered seal.

It has heretofore been assumed that the influence of gravity is negligible. In cases where the influence of gravity is not negligible, that is, in cases where the weight of the oil affects the oil feeding, the smooth entry of the oil into the bearing is possible when an upper end portion of the communicating hole is positioned at a level lower than that of the tapered seal on the oil hole side, Exp. (5) is satisfied, and the tapered seal wall surface depth $W_1$ is about 0.3 mm or more, for example.

Note here that relative vertical positions of the upper end portion of the communicating hole and the tapered seal on the oil hole side are defined by the direction of gravity and based on the orientation of the bearing at the time of the oil feeding.

Hereinafter, preferred embodiments of the present invention will be described with reference to the accompanying drawings. In the following description, it is assumed that a vertical direction is defined as a direction in which a central axis 9 extends and each member and relative positions of different members will be described based on this assumption.

It should be noted, however, that this definition of the vertical direction is simply applied for the sake of convenience in description, and should not be construed to restrict in any way the orientation of a dynamic pressure bearing, a spindle motor, or a disk drive apparatus according to any preferred embodiment of the present invention when actually installed in a device.

Reference is made again to FIG. 4. FIG. 4 is a diagram illustrating the structure of a dynamic pressure bearing 20 according to a preferred embodiment of the present invention. As illustrated in FIG. 4, the dynamic pressure bearing 20 preferably includes a stationary shaft 31 preferably arranged along the central axis 9 extending in the vertical direction, and a rotating sleeve portion 41 preferably arranged to support a circumference of the stationary shaft 31. A thrust washer 32 and a thrust cup 33 are preferably attached to the stationary shaft 31. The rotating sleeve portion 41 preferably includes a communicating hole 70 defined therein.

A minute gap is preferably defined between the stationary shaft 31 and the rotating sleeve portion 41. An outer circumferential surface of the stationary shaft 31 preferably includes therein a radial dynamic pressure groove array, and defines a radial dynamic pressure portions 21a and 21b in combination with an inner circumferential surface of the rotating sleeve portion 41. An upper surface of the rotating sleeve portion 41 and a lower surface of the thrust washer 32 together preferably define an upper thrust dynamic pressure portion 22a. A lower surface of the rotating sleeve portion 41 and an upper surface of the thrust cup 33 together preferably define a lower thrust dynamic pressure portion 22b. A lubricating oil 50 is preferably arranged in the minute gap and the communicating hole 70 in the rotating sleeve portion 41. The dynamic pressure bearing 20 is preferably arranged to rotatably support the rotating sleeve portion 41 through the lubricating oil 50.

The dynamic pressure bearing 20 is of a fixed shaft type. The stationary shaft 31, the thrust washer 32, and the thrust cup 33 together preferably define a stationary member 30. The rotating sleeve portion 41 and a rotating portion 42, which is arranged to extend radially outward from an outer circumferential portion of the rotating sleeve portion 41, together preferably define a rotating member 40.

FIG. 9 is a cross-sectional view illustrating a first tapered seal 61 and its vicinity in enlarged form. The first tapered seal 61 is preferably arranged in communication with the upper thrust dynamic pressure portion 22a, and is preferably defined between an outside surface of the thrust washer 32 and an inside surface of the rotating portion 42. The thrust washer 32 preferably includes an inclined surface at a top portion of the outside surface thereof. The rotating portion 42 preferably includes an inclined surface at a top portion of the inside surface thereof. The first tapered seal 61 is preferably defined by these two inclined surfaces. An upper liquid surface of the lubricating oil 50 is preferably positioned within the first tapered seal 61.

Returning to FIG. 4, the thrust cup 33 preferably includes an inside surface. The rotating member 40 preferably includes an inclined surface 41a at a bottom portion of an outside surface of the rotating sleeve portion 41. A second tapered seal 62 is preferably arranged in communication with the lower thrust dynamic pressure portion 22b, and is preferably defined between the inside surface 33a of the thrust cup 33 and the inclined surface 41a of the rotating sleeve portion 41. A lower liquid surface of the lubricating oil 50 is preferably positioned within the second tapered seal 62. Note that the radial dynamic pressure groove arrays 211a and 211b at the radial dynamic pressure portions 21a and 21b may be defined in the inner circumferential surface of the rotating sleeve portion 41.

The rotating sleeve portion 41 preferably includes the communicating hole 70. On the upper end, the communicating hole 70 preferably opens into a gap in communication with the upper thrust dynamic pressure portion 22a, which is defined by the lower surface of the thrust washer 32 and the upper surface of the rotating sleeve portion 41. On the lower end, the communicating hole 70 preferably opens into a gap that is in communication with the lower thrust dynamic pressure portion 22b, which is defined by the upper surface of the thrust cup 33 and the lower surface of the rotating sleeve portion 41.

In the dynamic pressure bearing 20, the opening angle of the first tapered seal 61 is preferably arranged to be greater than the opening angle of the second tapered seal 62. When the opening angle of the first tapered seal 61 is greater than the opening angle of the second tapered seal 62, the oil buffer depth of the first tapered seal 61 becomes smaller than the oil buffer depth of the second tapered seal 62, making it possible to reduce the size of the first tapered seal 61, and also to reduce the width of the oil surface positioned within the first tapered seal 61. This contributes to effectively reducing the evaporation of the oil 50. Moreover, splashing of the oil 50 out of the first tapered seal 61 is prevented from occurring even if an external shock is applied to the dynamic pressure bearing 20.

In accordance with the above-described preliminary investigations, the opening angle of the first tapered seal 61 illustrated in FIG. 9 is arranged to be about 60 degrees so that Exp. (5) may hold, and the tapered seal wall surface depth $W_1$ is arranged to be about 0.3 mm or more. This arrangement enables smooth oil feeding even when the first tapered seal 61 has a small depth. This allows the dynamic pressure bearing 20 to have a small axial dimension. This makes it possible to reduce the thickness of a spindle motor and hence the thickness of a disk drive apparatus.

Another preferred embodiment of the present invention will now be described below.

Figure 10:
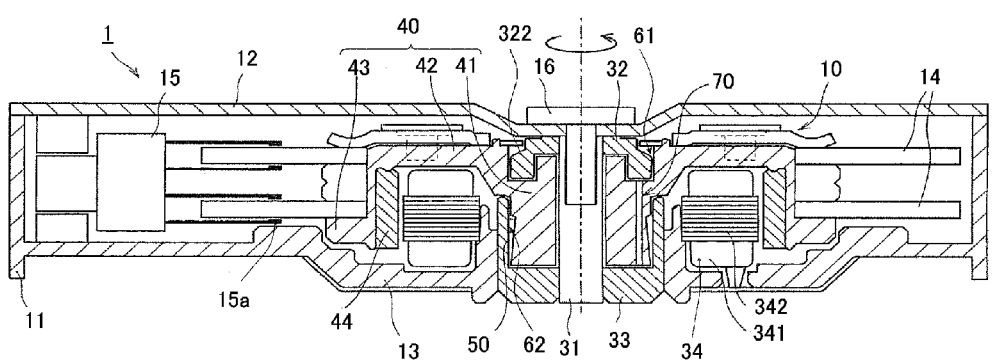
FIG. 10 is a cross-sectional view of a disk drive apparatus according to a preferred embodiment of the present invention.

FIG. 10 is a cross-sectional view of a disk drive apparatus 1 according to a preferred embodiment of the present invention. The disk drive apparatus 1 is a device designed to read and/or write information from or to magnetic disks 14 while rotating the disks 14. The disk drive apparatus 1 preferably includes an apparatus housing 11, the magnetic disks 14, an access portion 15, and a spindle motor 10. The spindle motor 10 is preferably provided with the dynamic pressure bearing 20 according to a preferred embodiment of the present invention.

The apparatus housing 11 is a case arranged to include the magnetic disks 14, the access portion 15, and the spindle motor 10. The access portion 15 is preferably arranged to move a head 15a along a recording surface of any of the magnetic disks 14 supported by the spindle motor 10 to read and/or write information from or to the magnetic disk 14.

The spindle motor 10 preferably includes the stationary member 30, which is fixed to the apparatus housing 11, and the rotating member 40, which is arranged to rotate about the central axis 9 while supporting the magnetic disks 14.

The stationary member 30 of the spindle motor 10 preferably includes the stationary shaft 31, the thrust washer 32, the thrust cup 33, and a stator unit 34. The stationary shaft 31 is preferably joined to a cover member 12 through a bolt 16.

The stator unit 34 preferably includes a plurality of coils 341 and a stator core 342. The stator unit 34 is preferably arranged to generate magnetic flux in accordance with drive currents supplied to the coils 341. The stator core 342 is preferably fixed to an outer circumferential surface of a holder portion. The stator core 342 is produced, for example, by subjecting an electromagnetic steel sheet to a stamping process to obtain a plurality of electromagnetic steel sheet stampings, and placing (laminating) the stampings one upon another in an axial direction. The coils 341 are preferably defined by lead wires wound around the stator core 342.

The rotating member 40 preferably includes the rotating sleeve portion 41, the rotating portion 42, and a rotor magnet 44. A disk mount portion 43 is preferably provided at an outer circumference of the rotating portion 42.

Figure 11:
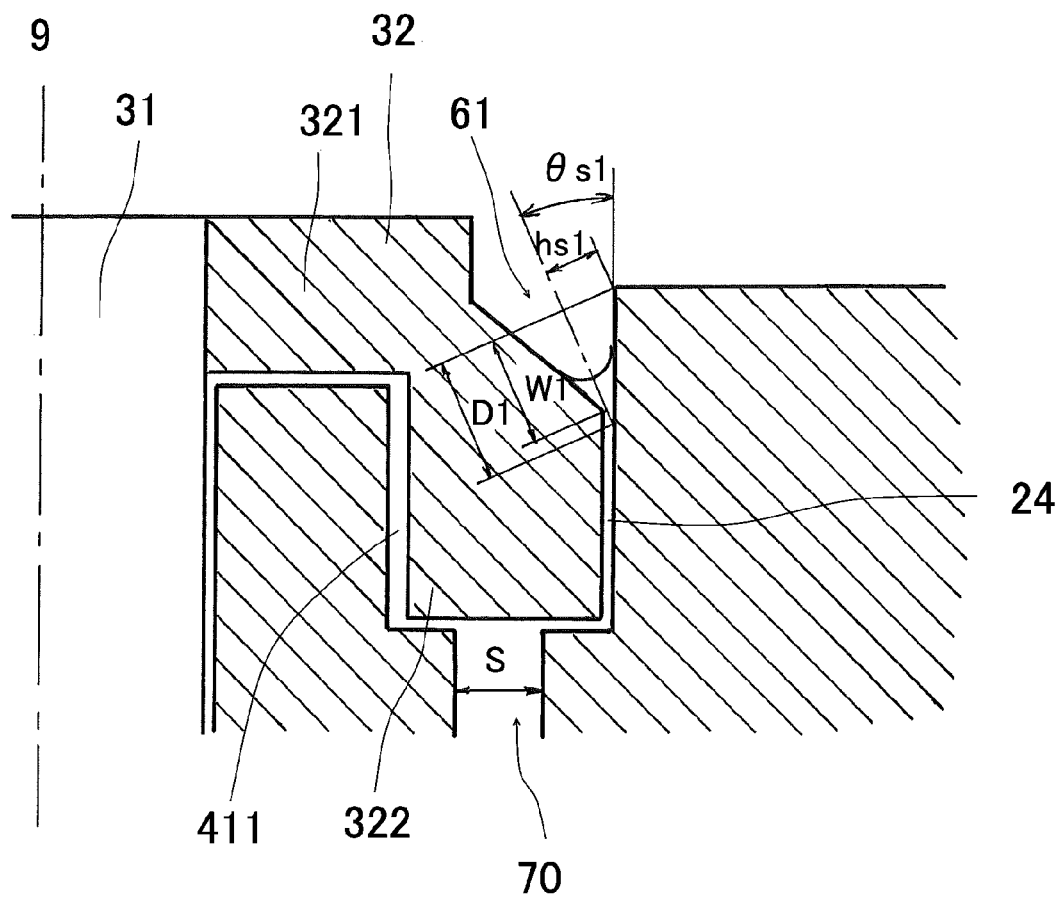
FIG. 11 is a cross-sectional view of a tapered seal on the oil hole side and its vicinity according to a preferred embodiment of the present invention.

FIG. 11 is a vertical cross-sectional view of the thrust washer 32 and its vicinity. As illustrated in FIG. 11, the thrust washer 32 preferably includes a radially spreading plate portion 321 and an annular projecting portion 322. The projecting portion 322 is preferably arranged to project downward from an outer edge portion of the plate portion 321.

FIG. 11 illustrates how $hs_1$, $\theta s_1$, $D_1$, and $W_1$ are defined with respect to the first tapered seal 61.

On an upper surface of the rotating sleeve portion 41, an annular recessed portion 411 is defined. The annular recessed portion 411 preferably corresponds in shape with the projecting portion 322. The projecting portion 322 is fixed while being placed inside the recessed portion 411. An inside surface of the recessed portion 411 which is radially opposed to an outer circumferential surface of the projecting portion 322 preferably includes a pumping groove array defined therein to produce a dynamic pressure in the lubricating oil 50. The pumping groove array is preferably arranged to apply a downward pressure onto the lubricating oil 50 while the rotating sleeve portion 41 is rotated with respect to the stationary shaft 31. This downward pressure contributes to preventing a leakage of the lubricating oil 50. Note that the pumping groove array may be defined in the outer circumferential surface of the projecting portion 322.

In the present preferred embodiment, the thrust washer 32 is preferably provided with the projecting portion 322 arranged to project downward, and the pumping groove array is defined in the inside surface of the recessed portion 411 which is radially opposed to the outer circumferential surface of the projecting portion 322 to define a pumping seal portion 24 in combination with the outer circumferential surface of the projecting portion 322. That is, in the present preferred embodiment, the gap which is in communication with the radial dynamic pressure portions 21a and 21b are bent twice to make the radial dynamic pressure portions 21a and 21b and the pumping seal portion 24 overlap with each other in a direction perpendicular or substantially perpendicular to the central axis 9. This makes it possible to reduce the axial dimension of the spindle motor 10, that is, to reduce the thickness of the spindle motor 10.

An oil containing an ester as a main component, such as a polyolester oil, a diester oil, or the like, is preferably used as the lubricating oil 50, for example.

Upper and lower thrust dynamic pressure groove arrays each arranged to produce a dynamic pressure in the lubricating oil 50 are defined in the upper surface and the lower surface, respectively, of the rotating sleeve portion 41. The lower surface of the thrust washer 32 and the upper surface of the rotating sleeve portion 41 opposed thereto together define the upper thrust dynamic pressure portion 22a. In addition, the upper surface of the thrust cup 33 and the lower surface of the rotating sleeve portion 41 opposed thereto together define the lower thrust dynamic pressure portion 22b. The rotating member 40 is preferably arranged to rotate while being axially supported through the dynamic pressures produced by these thrust dynamic pressure portions. Note that the upper thrust dynamic pressure groove array may be defined in the lower surface of the thrust washer 32. Also note that the lower thrust dynamic pressure groove array may be defined in the upper surface of the thrust cup 33.

In the disk drive apparatus 1, the upper surface of the thrust washer 32 is preferably arranged in contact with an inside surface of the cover member 12. This allows the thrust washer 32 to be supported by the cover member 12 even if an axially upward force is applied to the thrust washer 32 through the rotating sleeve portion 41 as a result of an external shock applied to the spindle motor 10. The support of the thrust washer 32 by the cover member 12 contributes to restricting the axial position of the thrust washer 32, thereby effectively preventing a removal of the thrust washer 32 from the stationary shaft 31.

While the dynamic pressure bearing 20 according to the above-described preferred embodiment of the present invention preferably is of the fixed shaft type, the present invention is also applicable to dynamic pressure bearings of a rotating shaft type.

Figure 12:
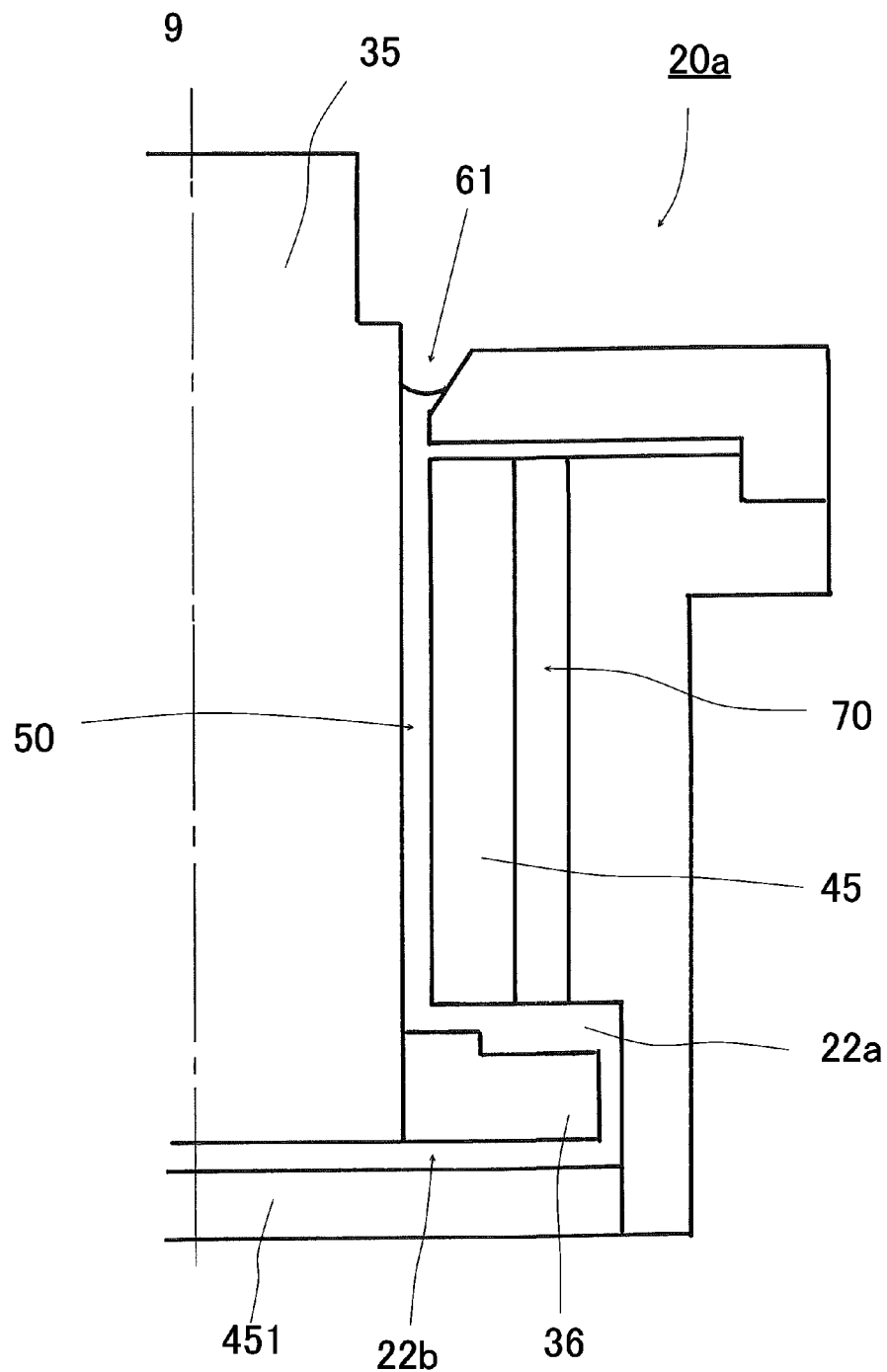
FIG. 12 is a cross-sectional view of a dynamic pressure bearing of a rotating shaft type according to a preferred embodiment of the present invention.

FIG. 12 is a cross-sectional view of a dynamic pressure bearing 20a of the rotating shaft type according to a preferred embodiment of the present invention.

The dynamic pressure bearing 20a includes a rotating shaft 35 arranged along a central axis 9 extending in the vertical direction, and a stationary sleeve portion 45 arranged to support a circumference of the rotating shaft 35. A collar portion 36 arranged to define thrust dynamic pressure portions 22a and 22b is provided at a lower end portion of the rotating shaft 35. A bottom portion of the stationary sleeve portion 45 is preferably closed with a bottom board 451. The rotating shaft 35 and the stationary sleeve portion 45 together define a minute gap therebetween. A radial dynamic pressure groove array is defined in an outer circumferential surface of the rotating shaft 35. Thrust dynamic pressure groove arrays are defined in an upper surface and a lower surface of the collar portion 36. The upper surface of the collar portion 36 and a lower surface of the stationary sleeve portion 45 together define the thrust dynamic pressure portion 22a. The lower surface of the collar portion 36 and an upper surface of the bottom board 451 together define the thrust dynamic pressure portion 22b. A communicating hole 70 which is in communication with the minute gap is defined in the stationary sleeve portion 45. A lubricating oil 50 is preferably arranged in the minute gap and the communicating hole 70. In the dynamic pressure bearing 20a being constructed as described above, the rotating shaft 35 is supported rotatably with respect to the stationary sleeve portion 45. In addition, a tapered seal 61 which is in communication with the minute gap is provided.

Also in the dynamic pressure bearing 20a, smooth oil feeding is possible when the opening angle of the tapered seal 61 is in the range of about 30 degrees inclusive to about 180 degrees exclusive, Exp. (5) is satisfied, and the tapered seal wall surface depth $W_1$ of the tapered seal 61 is about 0.3 mm or more. As described above, various preferred embodiments of the present invention are also applicable to dynamic pressure bearings of the rotating shaft type.

As is apparent from the structure of the dynamic pressure bearing 20a illustrated in FIG. 12, the number of tapered seals may be only one in some preferred embodiments of the present invention.

Figure 13A:
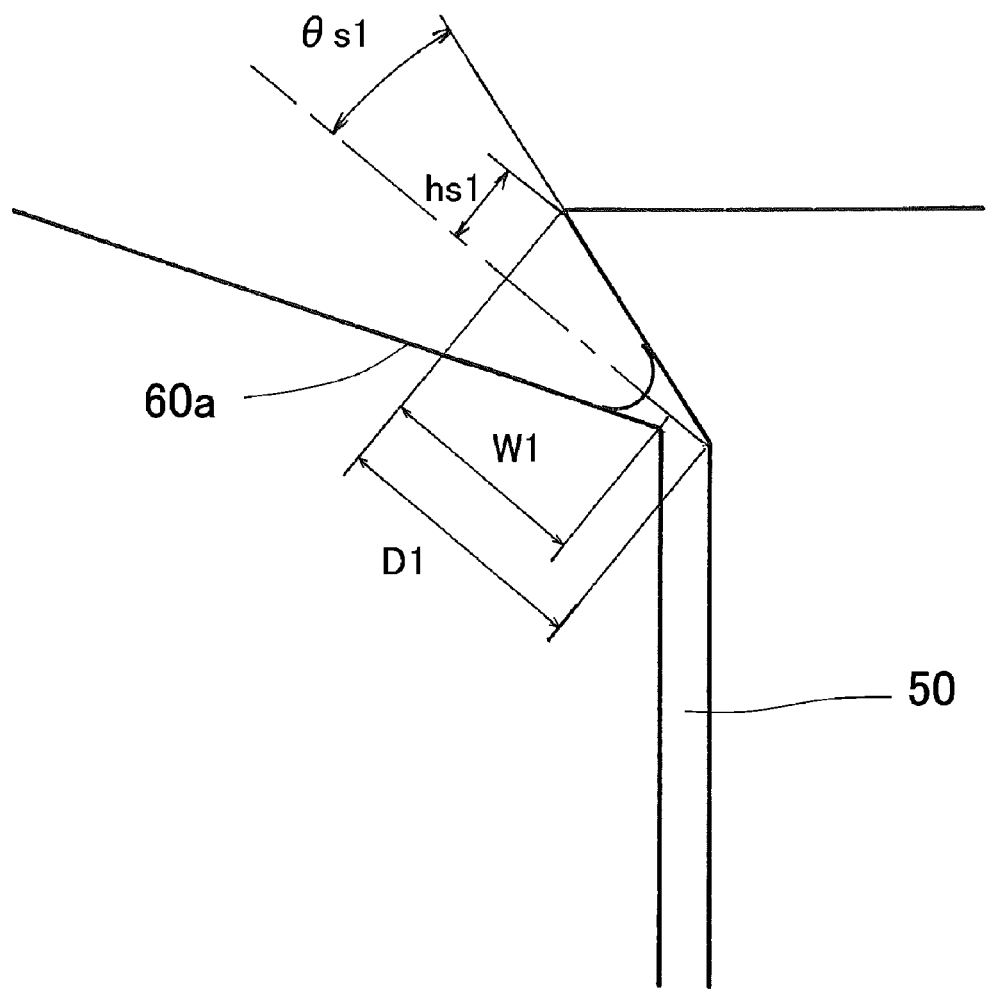
FIGS. 13A and 13B are each a cross-sectional view of a tapered seal on the oil hole side and its vicinity according to a preferred embodiment of the present invention.
Figure 13B:
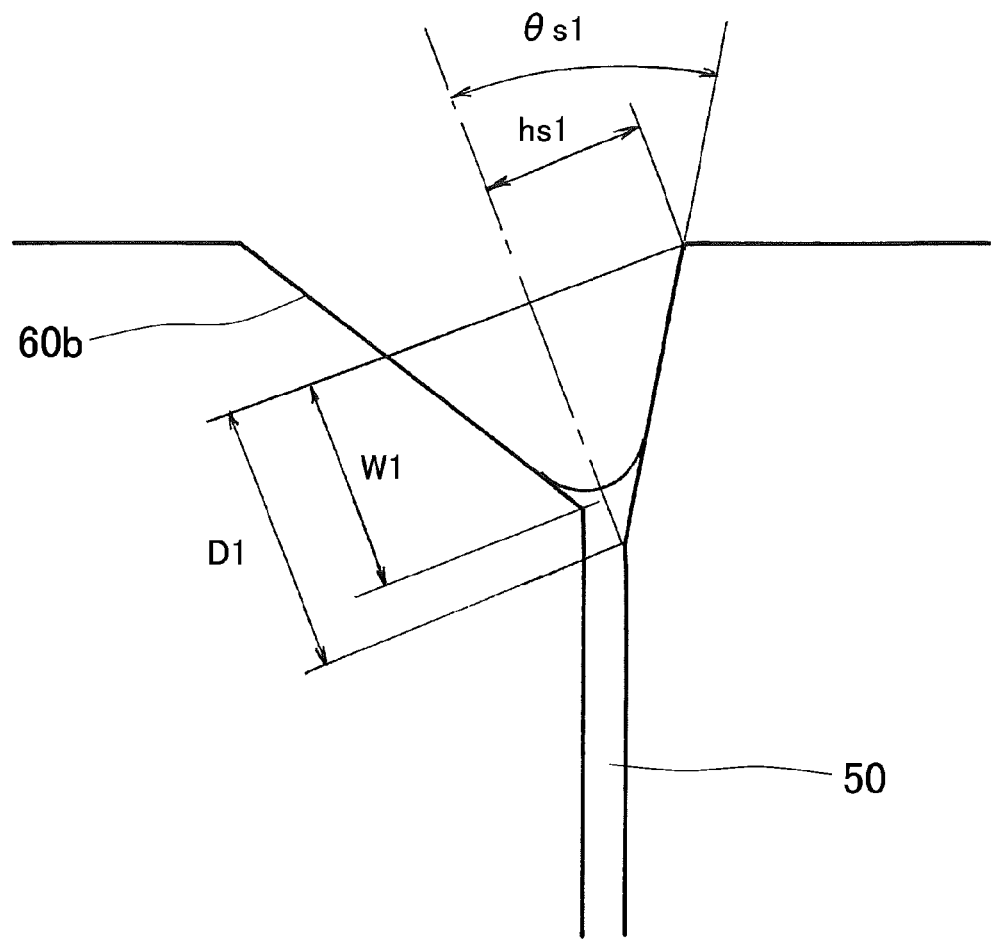

FIGS. 13A and 13B are each a cross-sectional view illustrating an oil hole and its vicinity according to another preferred embodiment of the present invention. Even in the cases of tapered seals illustrated in FIGS. 13A and 13B, smooth oil feeding is possible when Exp. (5) is satisfied, and the tapered seal wall surface depth $W_1$ is about 0.3 mm or more.

Note that how $hs_1$, $\theta s_1$, $D_1$, and $W_1$ are defined with respect to each of the tapered seals is illustrated in FIGS. 13A and 13B.

Figure 14A:
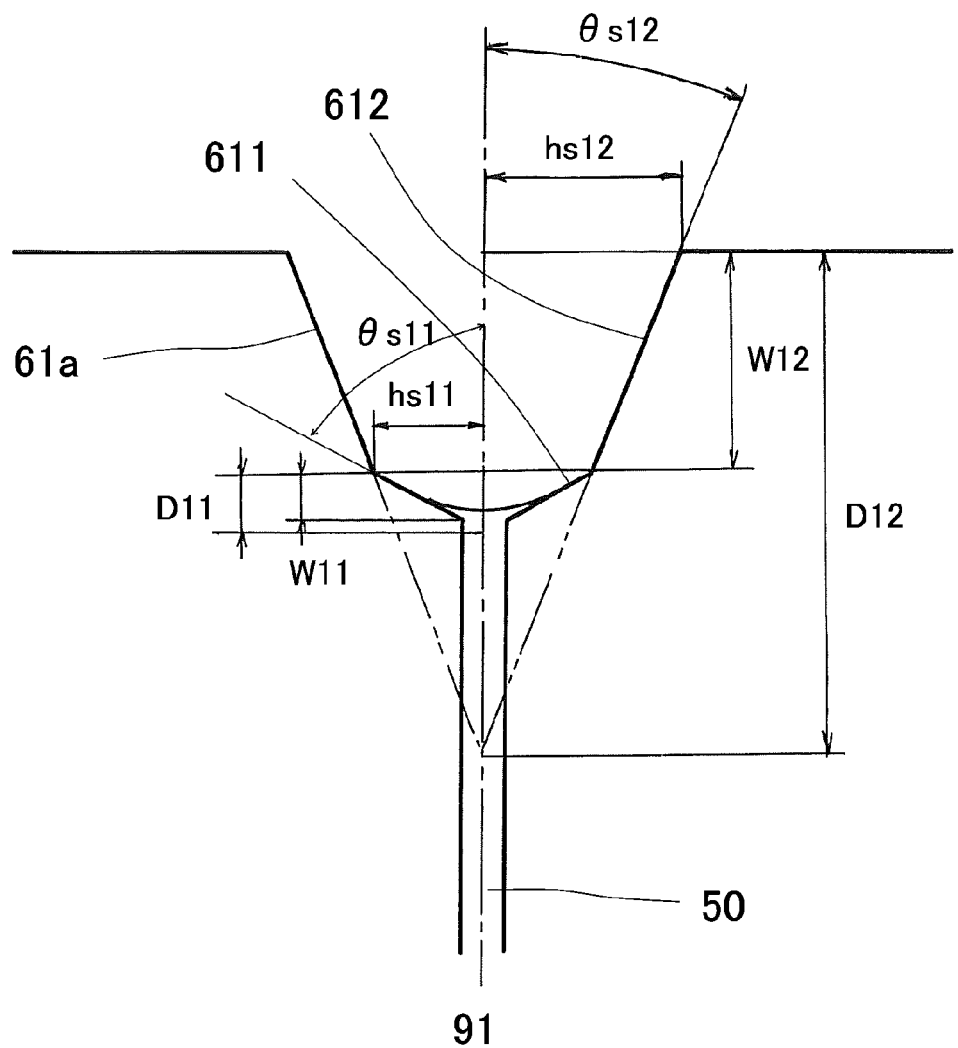
FIGS. 14A, 14B, 14C, 14D, 14E, 14F, and 14G are each a cross-sectional view of a tapered seal on the oil hole side and its vicinity according to a preferred embodiment of the present invention.

FIG. 14A is a cross-sectional view illustrating an oil hole and its vicinity according to yet another preferred embodiment of the present invention. In this preferred embodiment, as illustrated in the figure, a tapered seal 61a is defined in two steps with a central tapered seal wall surface 611 and an outer tapered seal wall surface 612. A tapered seal opening angle $(2 \times \theta s_{11})$ of the central tapered seal wall surface 611 is greater than a tapered seal opening angle $(2 \times \theta s_{12})$ of the outer tapered seal wall surface 612. In this preferred embodiment, smooth oil feeding is possible when Exp. (5) is satisfied with respect to a combination of the tapered seal opening angle $(2 \times \theta s_{11})$ and a tapered seal depth $D_{11}$ of the central tapered seal wall surface 611, and a tapered seal wall surface depth $W_{11}$ of the central tapered seal wall surface 611 is about 0.3 mm or more, or when Exp. (5) is satisfied with respect to a combination of the tapered seal opening angle $(2 \times \theta s_{12})$ and a tapered seal depth $D_{12}$ of the outer tapered seal wall surface 612, and a tapered seal wall surface depth $W_{12}$ of the outer tapered seal wall surface 612 is about 0.3 mm or more.

Note that, in calculation of the oil entry distance $q_2$ in Exp. (5), $\theta s_1$ is substituted with $\theta s_{11}$ or $\theta s_{22}$, and $D_2$ is substituted with $D_{11}$ or $D_{12}$, and that $W_2$ is substituted with $W_{11}$ or $W_{12}$. Similar substitutions should also be done with respect to other preferred embodiments of the present invention described below.

Note that how $hs_{11}$, $\theta s_{11}$, $D_{11}$, $W_{11}$, $hs_{12}$, $\theta s_{12}$, $D_{12}$, and $W_{12}$ in the tapered seal are defined is illustrated in FIG. 14A. With respect to the other preferred embodiments described below, such definitions are illustrated in the figures.

Figure 14B:
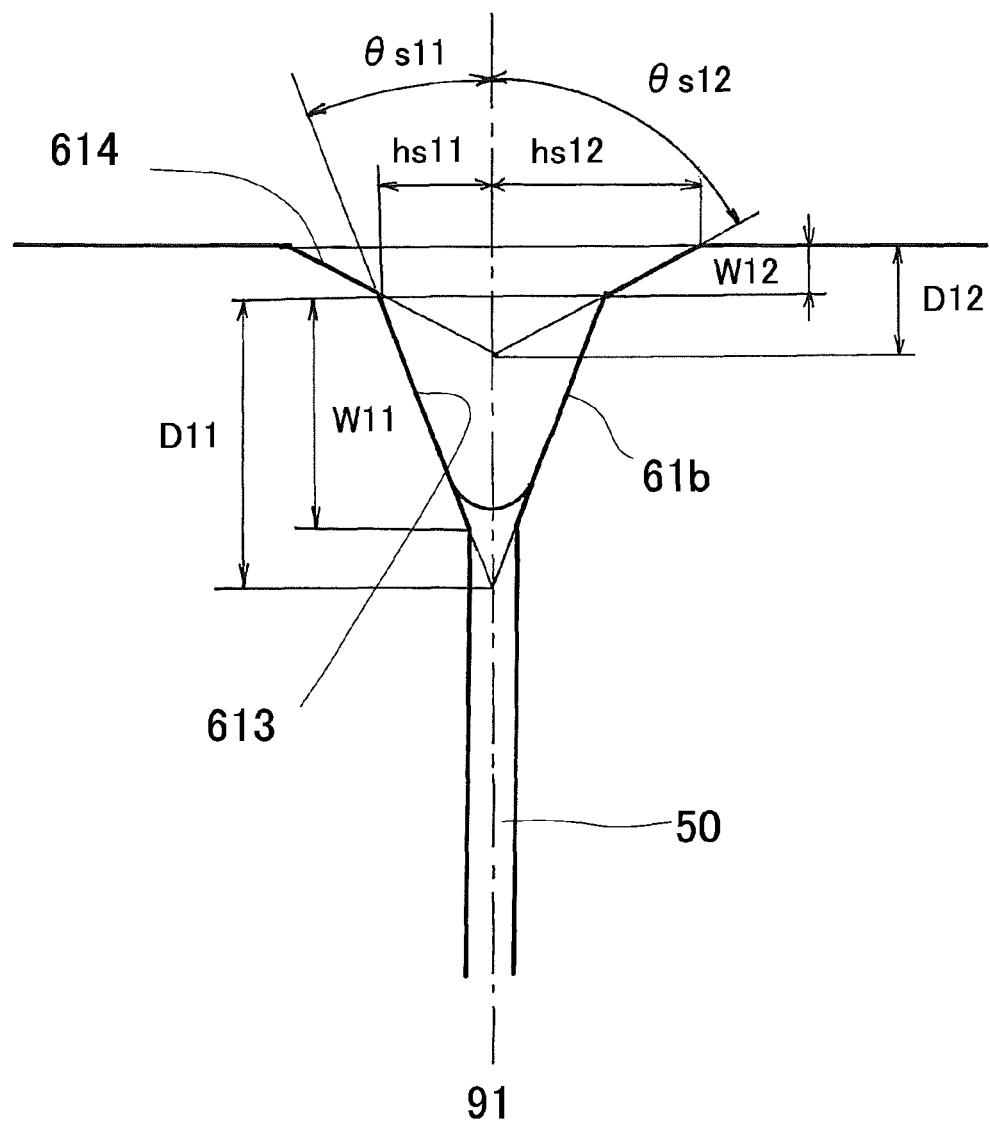

FIG. 14B is a cross-sectional view illustrating an oil hole and its vicinity according to yet another preferred embodiment of the present invention. In this preferred embodiment, as illustrated in the figure, a tapered seal 61b is defined in two steps with a central tapered seal wall surface 613 and an outer tapered seal wall surface 614. A tapered seal opening angle ($2\times\theta_{11}$) of the central tapered seal wall surface 613 is smaller than a tapered seal opening angle ($2\times\theta s_{12}$) of the outer tapered seal wall surface 614. In this preferred embodiment, smooth oil feeding is possible when Exp. (5) is satisfied with respect to a combination of the tapered seal opening angle ($2\times\theta s_{11}$) and a tapered seal depth $D_{11}$ of the central tapered seal wall surface 613, and a tapered seal wall surface depth $W_{11}$ of the central tapered seal wall surface 613 is about 0.3 mm or more, or when Exp. (5) is satisfied with respect to a combination of the tapered seal opening angle ($2\times\theta s_{12}$) and a tapered seal depth $D_{12}$ of the outer tapered seal wall surface 614, and a tapered seal wall surface depth $W_{12}$ of the outer tapered seal wall surface 614 is about 0.3 mm or more, for example.

Figure 14C:
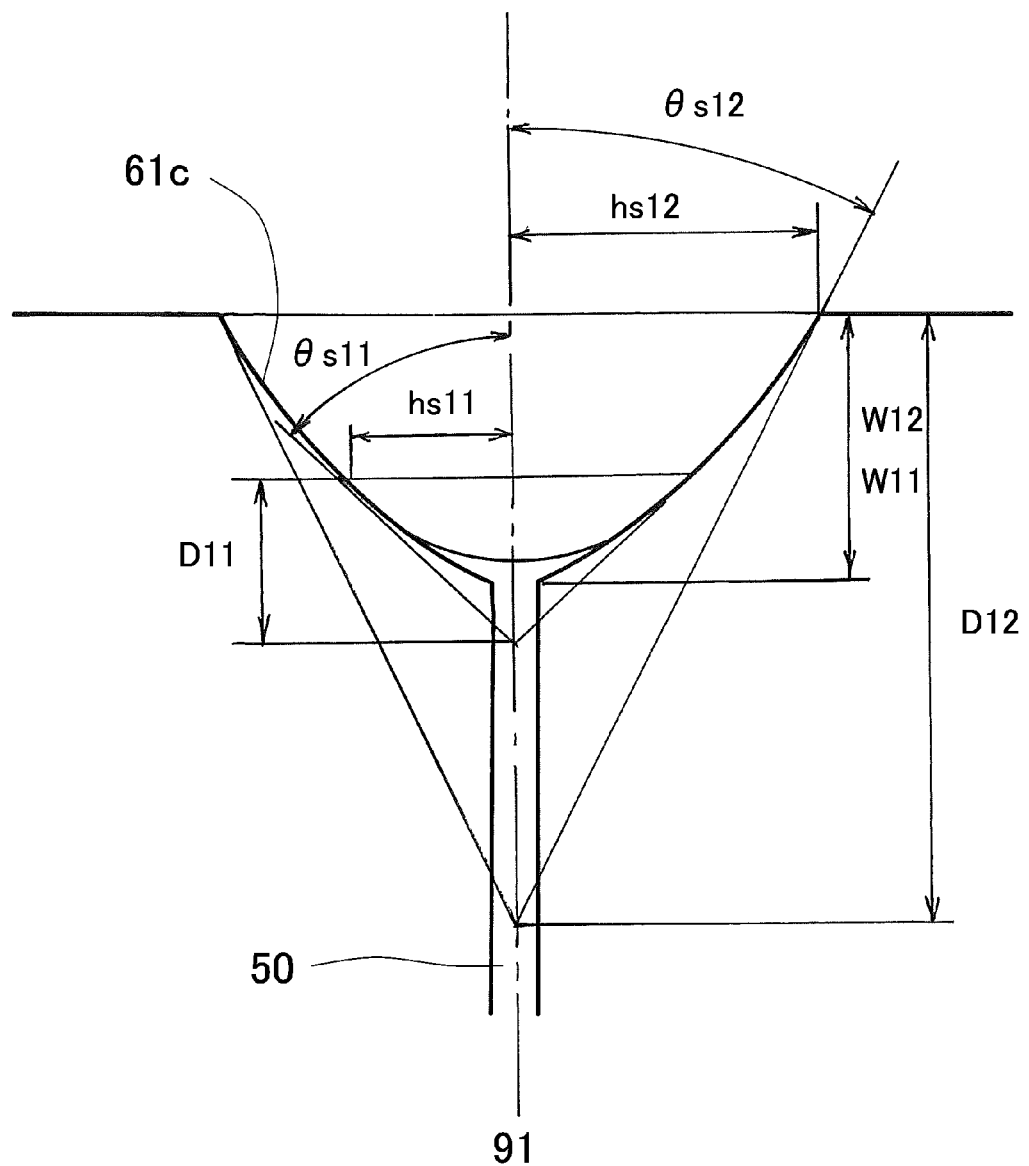
Figure 14D:
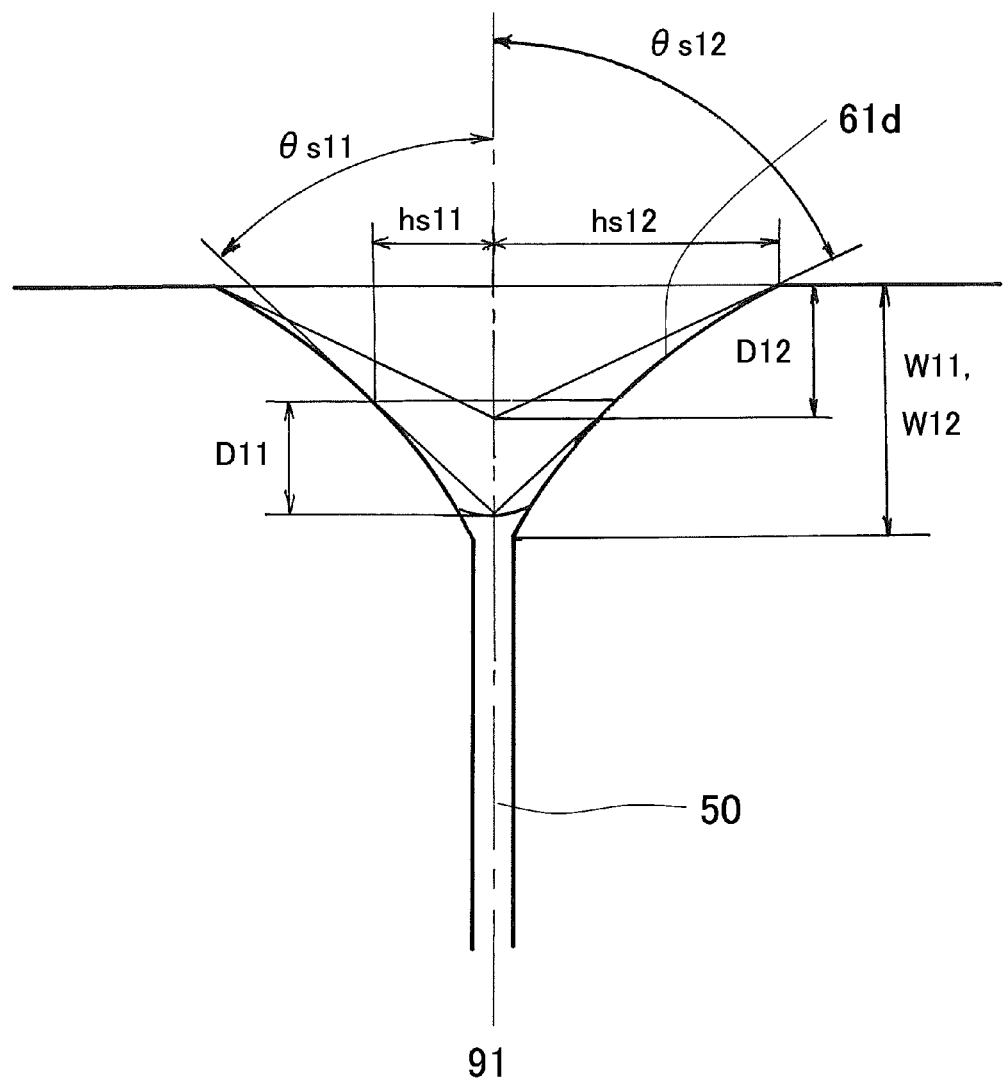

FIGS. 14C and 14D are each a cross-sectional view illustrating an oil hole and its vicinity according to yet another preferred embodiment of the present invention. As illustrated in the figures, for each of these two preferred embodiments, a wall surface of a tapered seal 61c or 61d preferably has a curved shape. In each of these preferred embodiments, with respect to any tangents to the wall surface of the tapered seal, a tapered seal opening angle ($2\times\theta s_{11}$) and a tapered seal depth $D_{11}$, a tapered seal opening angle ($2\times\theta s_{12}$) and a tapered seal depth $D_{12}$, and so on are calculated. Smooth oil feeding is possible when Exp. (5) is satisfied with respect to any one of the tangents, and the tapered seal wall surface depth $W_{11}$ or $W_{12}$ is about 0.3 mm or more, for example.

Note that, while only $D_{11}$, $D_{12}$, $\theta s_{11}$, and $\theta s_{12}$ are illustrated in FIGS. 14C and 14D, it should be appreciated that the tapered seal opening angle and the tapered seal depth can also be defined with respect to many other tangents to the wall surface of the tapered seal.

Figure 14E:
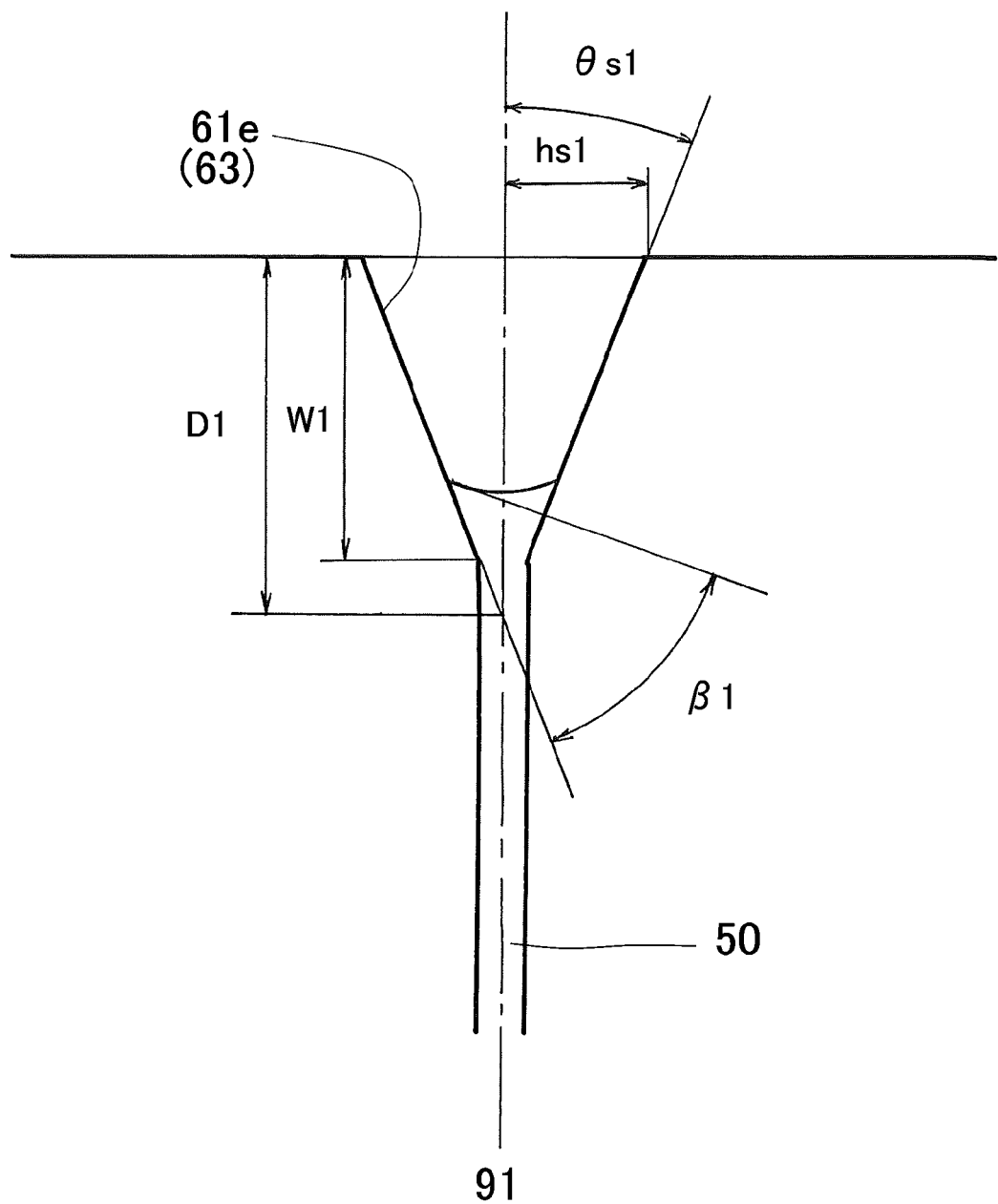

FIG. 14E is a vertical cross-sectional view illustrating an oil hole and its vicinity according to yet another preferred embodiment of the present invention. In the preferred embodiment illustrated in FIG. 14E, an oil-repellent agent is applied to a wall surface of a tapered seal 61e to form an oil-repellent film 63, thereby increasing the contact angle between the oil and the wall surface of the tapered seal 61e. In this preferred embodiment, smooth oil feeding is possible when Exp. (5) is satisfied with respect to a tapered seal opening angle ($2\times\theta s_1$), a tapered seal depth $D_1$, and a contact angle $\beta_1$ between the oil and the wall surface of the tapered seal 61e, and a tapered seal wall surface depth $W_1$ is about 0.3 mm or more, for example. Examples of the oil-repellent agent include perfluoroalkylpolyether.

Figure 14F:
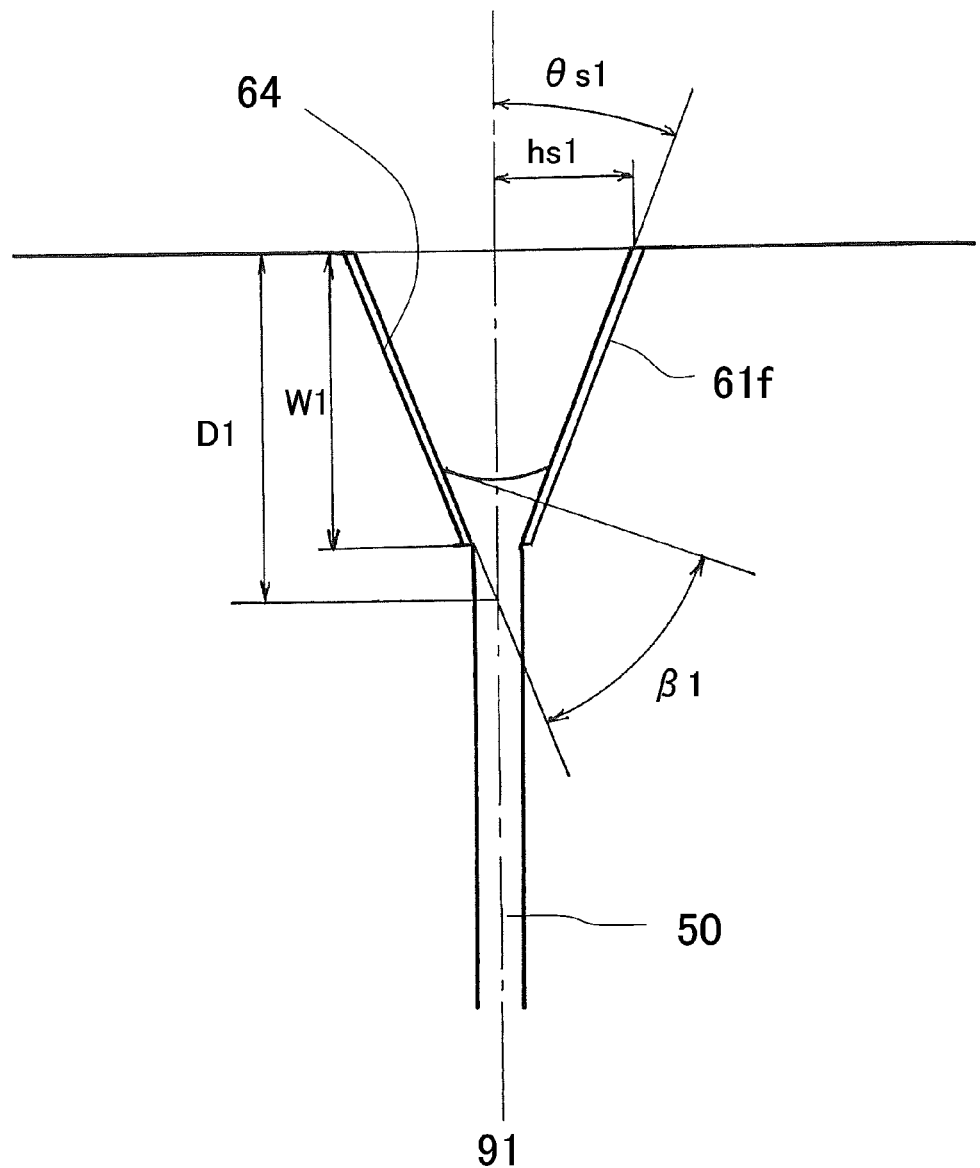

FIG. 14F is a vertical cross-sectional view illustrating an oil hole and its vicinity according to yet another preferred embodiment of the present invention. In the preferred embodiment illustrated in FIG. 14F, a component 64 made of an oil-repellent material is preferably provided on a wall surface of a tapered seal 61f, resulting in an increased contact angle defined between the oil and the oil-repellent component. In this preferred embodiment, smooth oil feeding is possible when Exp. (5) is satisfied with respect to a tapered seal opening angle ($2\times\theta s_1$), a tapered seal depth $D_1$, and a contact angle $\beta_1$ between the oil and the wall surface of the tapered seal, and a tapered seal wall surface depth $W_1$ is 0.3 mm or more. Examples of the oil-repellent material include fluorine resins.

Figure 14G:
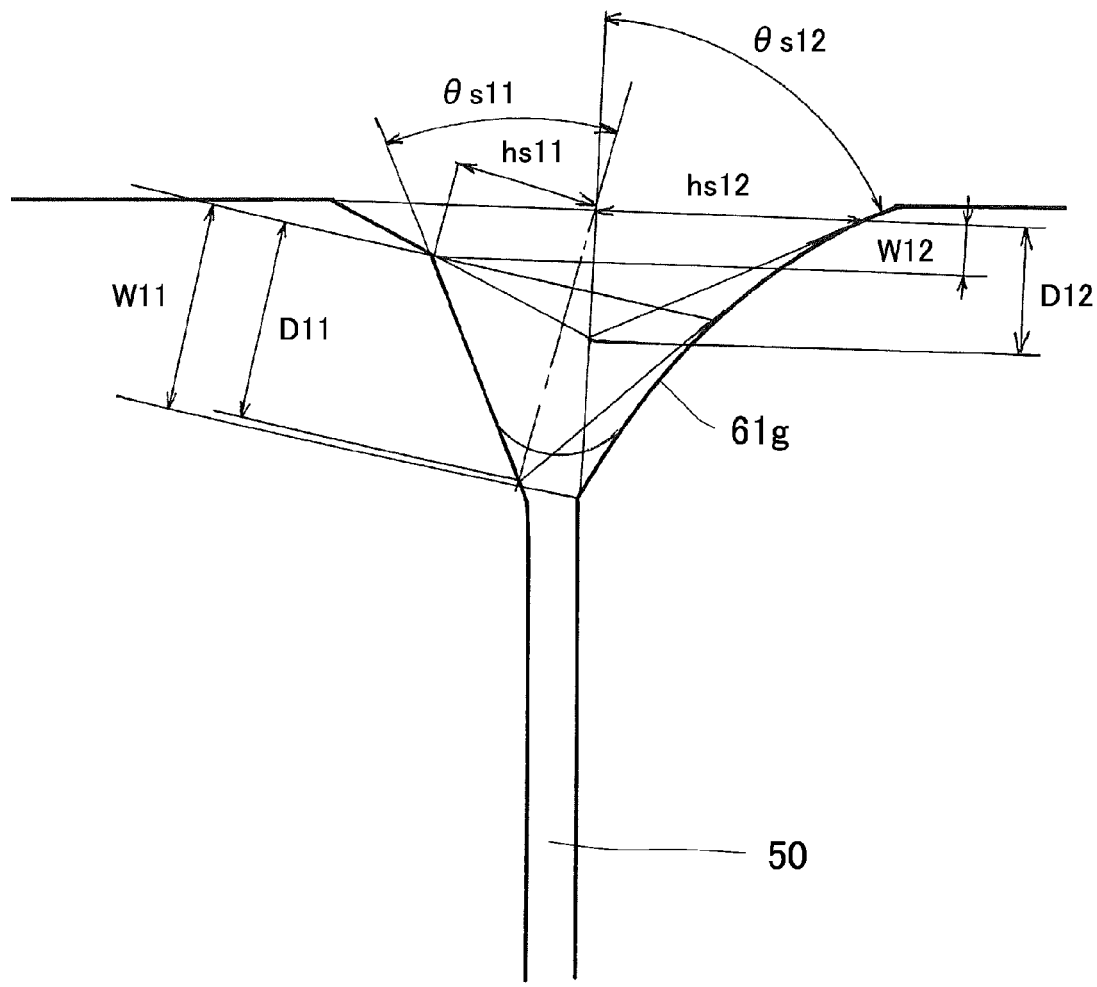

FIG. 14G is a cross-sectional view illustrating an oil hole and its vicinity according to yet another preferred embodiment of the present invention. As is apparent from FIG. 14G, this preferred embodiment is a combination of the above-described preferred embodiments illustrated in FIGS. 14B and 14D. Also in this preferred embodiment, smooth oil feeding is possible when Exp. (5) is satisfied with respect to the contact angle $\beta_1$ between the oil and the wall surface of the tapered seal, and the tapered seal opening angle ($2\times\theta s_1$) and the tapered seal depth $D_1$ with respect to any position, and the tapered seal wall surface depth $W_1$ is about 0.3 mm or more. Examples of "any position" include a position that defines $\theta s_{11}$ and $D_{11}$ and a position that defines $\theta s_{12}$ and $D_{12}$ illustrated in FIG. 14G. It should be appreciated, however, that $\theta s_{11}$ and $D_{11}$, and $\theta s_{12}$ and $D_{12}$, are illustrated in FIG. 14G merely by way of example, and are not meant to restrict "any position".

Note that two or more of the above-described preferred embodiments may be combined together flexibly as long as Exp. (5) is satisfied and the tapered seal wall surface depth $W_{11}$ or $W_{12}$ is about 0.3 mm or more. For example, the preferred embodiments illustrated in FIGS. 14A and 14D may be combined together, and the preferred embodiments illustrated in FIGS. 14B and 14E may be combined together.

As described above, dynamic pressure bearings according to preferred embodiments of the present invention are defined by several parameters derived from the shape of the tapered seal. Regarding the dynamic pressure bearings according to preferred embodiments of the present invention, it is therefore sufficient that Exp. (5) is satisfied with respect to the tapered seal opening angle ($2\times\theta s_1$), the tapered seal depth $D_1$, the contact angle $\beta_1$ between the oil and the wall surface of the tapered seal, and the inside diameter S of the communicating hole, and that the tapered seal wall surface depth $W_1$ is about 0.3 mm or more, for example. In other words, the tapered seal of dynamic pressure bearings according to preferred embodiments of the present invention may be in any shape as long as Exp. (5) is satisfied and the tapered seal wall surface depth $W_1$ is about 0.3 mm or more, for example.

Figure 15A:
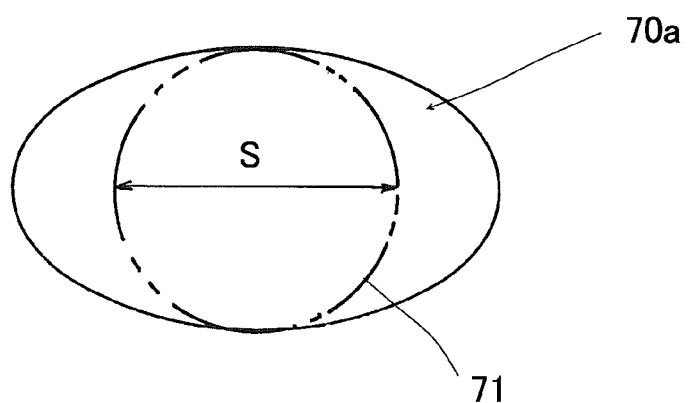
FIGS. 15A, 15B, 15C, and 15D are each a cross-sectional view of a communicating hole and its vicinity according to a preferred embodiment of the present invention.

FIG. 15A is an enlarged cross-sectional view illustrating the shape of a communicating hole 70a according to yet another preferred embodiment of the present invention. As illustrated in FIG. 15A, the communicating hole 70a is in the shape of an ellipse. In this preferred embodiment, the inside diameter S of the communicating hole is defined as the diameter of the largest circle 71 inscribed in a wall surface of the communicating hole 70a.

Figure 15B:
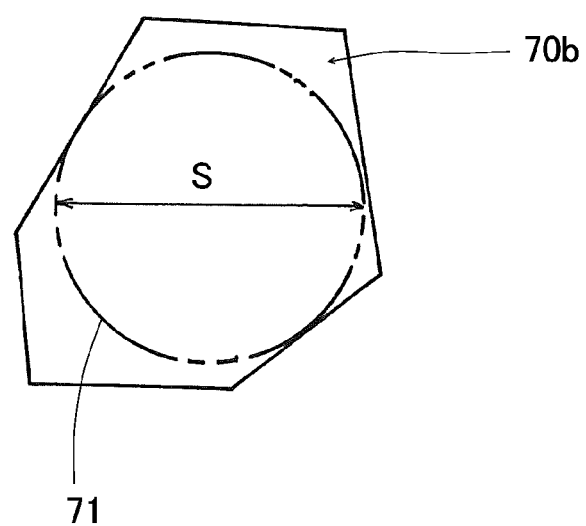

FIG. 15B is an enlarged cross-sectional view illustrating the shape of a communicating hole 70b according to yet another preferred embodiment of the present invention. As illustrated in FIG. 15B, the communicating hole 70b according to this preferred embodiment is in the shape of a polygon. Note that, while the communicating hole 70b according to the preferred embodiment illustrated in FIG. 15B is in the shape of a hexagon, cross-sections of communicating holes according to other preferred embodiments of the present invention may be in the shape of any desirable polygon having multiple sides. Also note that the sides of such a polygon may have different lengths, and that adjacent sides of the polygon may define an angle of any degree. In the preferred embodiment illustrated in FIG. 15B, the inside diameter S of the communicating hole is defined as the diameter of the largest circle 71 inscribed in a wall surface of the communicating hole 70b.

Figure 15C:
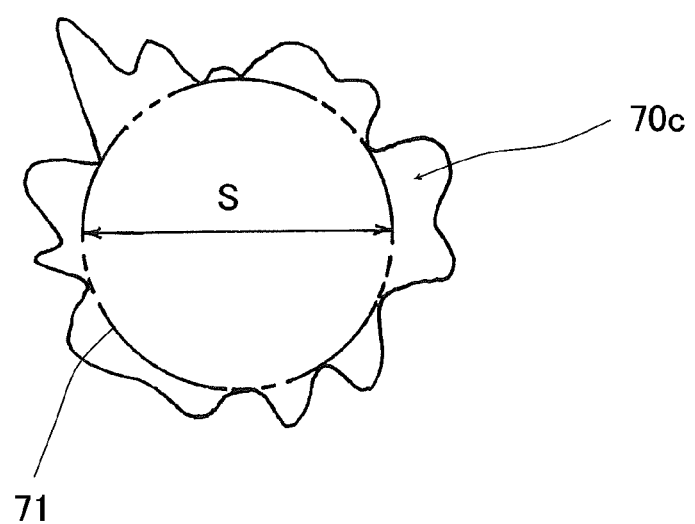

FIG. 15C is an enlarged cross-sectional view illustrating the shape of a communicating hole 70c according to yet another preferred embodiment of the present invention. As illustrated in FIG. 15C, the communicating hole 70c according to this preferred embodiment preferably has an asymmetrical or complicated shape. In preferred embodiments in which the communicating hole preferably has an asymmetrical or complicated shape, and not a circular, an elliptical, or a polygonal shape, as in this preferred embodiment, the inside diameter S of the communicating hole is defined as the diameter of the largest circle 71 inscribed in a wall surface of the communicating hole, as illustrated in FIG. 15C.

Figure 15D:
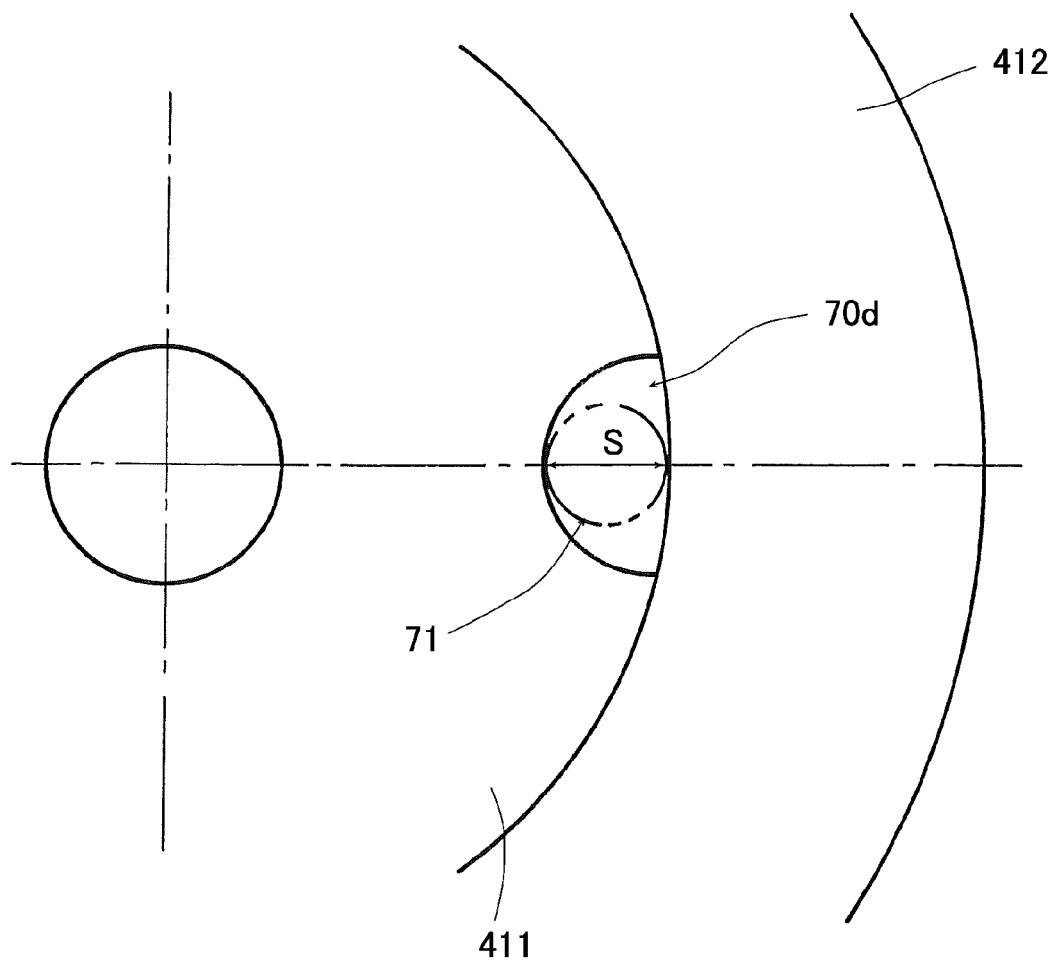

FIG. 15D is an enlarged cross-sectional view illustrating the shape of a communicating hole 70d according to yet another preferred embodiment of the present invention. As illustrated in FIG. 15D, the communicating hole 70d according to this preferred embodiment is defined by two components 411 and 412 joined to each other. In preferred embodiments in which two components are joined together to define a communicating hole, as in this preferred embodiment, the inside diameter S of the communicating hole is defined as the diameter of the largest circle 71 inscribed in a wall surface of the communicating hole, as illustrated in FIG. 15D. Note that, although the communicating hole 70d is defined by two components in the preferred embodiment illustrated in FIG. 15D, the communicating hole may be defined by three or more components in other preferred embodiments of the present invention.

As described above, dynamic pressure bearings according to preferred embodiments of the present invention are defined by parameters derived from the shape of the communicating hole. Therefore, the communicating hole of dynamic pressure bearings according to preferred embodiments of the present invention may be in any shape as long as Exp. (5) is satisfied and the tapered seal wall surface depth $W_1$ is about 0.3 mm or more.

While preferred embodiments of the present invention have been described above, the present invention is not limited to the above-described preferred embodiments.

For example, the communicating hole may be arranged to extend along the central axis as in most of the above-described preferred embodiments, or may be arranged to extend in an oblique direction with respect to the central axis.

Dynamic pressure bearings according to preferred embodiments of the present invention may be used in spindle motors, and such spindle motors may be used in a variety of information recording apparatuses. Spindle motors for use in magnetic disk drive apparatuses are, in particular, required to exhibit high performance in terms of a rotational characteristic of the dynamic pressure bearing. Therefore, application of the present invention to spindle motors for use in magnetic disk drive apparatuses has great technological significance. Note that the present invention is applicable not only to spindle motors for use in magnetic disk drive apparatuses but also to spindle motors for use in optical disk drive apparatuses or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A dynamic pressure bearing comprising:
a shaft arranged along a central axis extending in a vertical direction; and
a sleeve portion arranged to support a circumference of the shaft; wherein
the shaft and the sleeve portion are arranged to define a gap therebetween;
at least one of an outer circumferential surface of the shaft and an inner circumferential surface of the sleeve portion includes a radial dynamic pressure groove array defined therein;
the sleeve portion includes a communicating hole defined therein, the communicating hole being arranged in communication with the gap;
at least one tapered seal is arranged in communication with the gap, the at least one tapered seal including a first tapered seal through which oil feeding is possible;
the gap, the communicating hole, and the at least one tapered seal include a lubricating oil arranged therein;
the shaft and the sleeve portion are supported through the lubricating oil such that one of the shaft and the sleeve portion is rotatable with respect to the other;
an opening angle $2\times\theta s_1$ of the first tapered seal is in a range of about 30 degrees inclusive to about 180 degrees exclusive;
a tapered seal wall surface depth $W_1$ of the first tapered seal is 0.3 mm or more; and $$S < 2q_2$$

$$q_2 = \frac{D_1 \cdot \tan\theta s_1 \cdot \cos(\theta s_2 + \beta_2)}{\sin\theta s_2 \cdot \cos(\theta s_1 + \beta_1)}$$

where S is an inside diameter of the largest imaginary circle inscribed in the communicating hole, $\beta_1$ is a contact angle between the lubricating oil and a wall surface of the first tapered seal, $\beta_2$ is a contact angle between the lubricating oil and a wall surface of the communicating hole, $2\times\theta s_1$ is the opening angle of the first tapered seal, $2\times\theta s_2$ is an angle defined between the wall surface of the communicating hole and a wall surface opposite an end portion of the communicating hole, $D_1$ is a tapered seal depth of the first tapered seal, and $q_2$ is a distance over which the lubricating oil has traveled beyond the wall surface of the communicating hole along the wall surface opposite the end portion of the communicating hole.

2. The dynamic pressure bearing according to claim 1, wherein the opening angle $2\times\theta s_1$ of the first tapered seal is in a range of about 30 degrees inclusive to about 160 degrees inclusive.

3. The dynamic pressure bearing according to claim 1, wherein the opening angle $2\times\theta s_1$ of the first tapered seal is in a range of about 40 degrees inclusive to about 90 degrees inclusive.

4. The dynamic pressure bearing according to claim 1, wherein the tapered seal wall surface depth $W_1$ of the first tapered seal is in a range of about 0.3 mm inclusive to about 5 mm inclusive.

5. The dynamic pressure bearing according to claim 4, wherein the tapered seal wall surface depth $W_1$ of the first tapered seal is in a range of about 0.3 mm inclusive to about 3 mm inclusive.

6. The dynamic pressure bearing according to claim 1, wherein a volume of the first tapered seal is smaller than a volume of the lubricating oil fed into the dynamic pressure bearing.

7. The dynamic pressure bearing according to claim 1, wherein the tapered seal depth $D_1$ of the first tapered seal is about 1 mm or less.

8. The dynamic pressure bearing according to claim 1, wherein the lubricating oil has a kinematic viscosity of about 60 mm$^2$/s or less at a temperature of about 40° C.

9. The dynamic pressure bearing according to claim 1, wherein the first tapered seal includes an oil-repellent film arranged on a surface thereof.

10. The dynamic pressure bearing according to claim 1, wherein the wall surface of the first tapered seal is made of an oil-repellent material.

11. The dynamic pressure bearing according to claim 1, wherein
   the at least one tapered seal includes the first tapered seal and a second tapered seal; and
   the opening angle of the first tapered seal is equal to or greater than a sum of an opening angle of the second tapered seal and about 10 degrees.

12. A spindle motor comprising the dynamic pressure bearing of claim 1.

13. An information recording apparatus comprising the spindle motor of claim 12.

\* \* \* \* \*